(12) United States Patent
Henao

(10) Patent No.: US 9,365,225 B2
(45) Date of Patent: Jun. 14, 2016

(54) TRANSFORMATIVE HAND CART

(71) Applicant: Elvis Henao, Davie, FL (US)

(72) Inventor: Elvis Henao, Davie, FL (US)

( * ) Notice: Subject to any disclaimer, the term of this patent is extended or adjusted under 35 U.S.C. 154(b) by 0 days.

(21) Appl. No.: 14/661,765

(22) Filed: Mar. 18, 2015

(65) Prior Publication Data

US 2016/0052534 A1   Feb. 25, 2016

Related U.S. Application Data

(60) Provisional application No. 62/040,617, filed on Aug. 22, 2014.

(51) Int. Cl.
*B62B 3/02* (2006.01)
*B62B 3/00* (2006.01)
*B62B 5/06* (2006.01)
*B62B 1/12* (2006.01)

(52) U.S. Cl.
CPC ... *B62B 3/02* (2013.01); *B62B 1/12* (2013.01); *B62B 3/001* (2013.01); *B62B 3/002* (2013.01); *B62B 5/067* (2013.01)

(58) Field of Classification Search
CPC .......... B62B 1/002; B62B 1/12; B62B 1/208; B62B 5/061; B62B 5/067; B62B 3/02; B62B 3/022; B62B 3/07; B62B 2205/04; B62B 2206/11; B62B 2206/006
See application file for complete search history.

(56) References Cited

U.S. PATENT DOCUMENTS

| | | | |
|---|---|---|---|
| 3,194,576 A * | 7/1965 | Kunkle | B62B 1/208 |
| | | | 280/47.26 |
| 3,416,682 A | 12/1968 | Pezzuti | |
| 4,049,284 A | 9/1977 | Capper | |
| 4,227,709 A | 10/1980 | Gradwohl et al. | |
| 4,505,495 A * | 3/1985 | Foss | B62B 3/02 |
| | | | 16/113.1 |
| 5,186,479 A | 2/1993 | Flowers | |
| 5,536,034 A * | 7/1996 | Miller | B62B 1/002 |
| | | | 108/11 |
| 5,769,449 A | 6/1998 | Keesee | |
| 5,857,695 A | 1/1999 | Crowell | |
| 6,102,433 A * | 8/2000 | Stevens | B62B 1/125 |
| | | | 280/47.29 |
| 6,220,611 B1 * | 4/2001 | Shapiro | B62B 3/007 |
| | | | 280/47.34 |
| 6,364,328 B1 * | 4/2002 | Stahler, Sr. | B62B 1/002 |
| | | | 280/47.18 |
| 6,588,775 B2 * | 7/2003 | Malone, Jr. | B62B 1/002 |
| | | | 280/47.18 |
| 6,845,991 B1 * | 1/2005 | Ritucci | B62B 3/007 |
| | | | 280/30 |

(Continued)

FOREIGN PATENT DOCUMENTS

DE          3518624 A1 * 11/1986 ............. B62B 1/002

OTHER PUBLICATIONS

Author Unknown, The Muletto: Multi-Function Garden Cart & Wheelbarrow, http://www.muletto.com, May 21, 2014.

*Primary Examiner* — Emma K Frick
(74) *Attorney, Agent, or Firm* — The Concept Law Group, P.A.; Scott D. Smiley; Mark C. Johnson

(57) ABSTRACT

A transformative hand cart with a cart body, a first and second handle member translatably coupled to a first and second respective ends of the cart body, a left and right support rail translatably coupled to a left and right respective sides of the cart body, a first and second end support member translatably coupled to a first and second respective ends of the cart body, and a plurality of wheels coupled to the cart body, wherein the first and second handle members, the left and right support rails, and the first and second end support members are at least partially recessed into the upper surface of the cart body in a storing position and are operable to independently open in various positions.

14 Claims, 27 Drawing Sheets

(56) References Cited

U.S. PATENT DOCUMENTS

| | | | |
|---|---|---|---|
| 6,966,574 B1 * | 11/2005 | Dahl | B62B 1/002 280/47.18 |
| 7,168,712 B2 | 1/2007 | Celli | |
| 7,201,385 B2 | 4/2007 | Renz et al. | |
| 7,306,245 B1 | 12/2007 | Lowe | |
| 7,441,783 B2 | 10/2008 | Clark et al. | |
| 7,523,955 B2 * | 4/2009 | Blair | B62B 3/007 280/47.34 |
| 7,588,257 B2 * | 9/2009 | Gu | B62B 3/16 280/32.6 |
| D652,190 S * | 1/2012 | Slaton | D34/17 |
| 8,100,430 B2 * | 1/2012 | Meyers | B62B 1/002 280/30 |
| 8,465,046 B2 | 6/2013 | Meyers et al. | |
| 8,596,671 B2 * | 12/2013 | Myrant | B62B 1/208 280/47.18 |
| 8,602,443 B2 | 12/2013 | Moore et al. | |
| 8,764,046 B2 * | 7/2014 | Baldemor | B62B 1/002 280/47.29 |
| 9,096,249 B2 * | 8/2015 | Gibson | B62B 3/022 |
| 9,108,656 B1 * | 8/2015 | Nolan | B62B 3/02 |
| 2005/0006877 A1 | 1/2005 | Kachkovsky | |
| 2005/0212242 A1 * | 9/2005 | Cheng | B62B 3/02 280/79.11 |
| 2012/0153585 A1 * | 6/2012 | Ryan | B62B 1/002 280/47.18 |
| 2013/0127138 A1 | 5/2013 | Ferree, Jr. | |

* cited by examiner

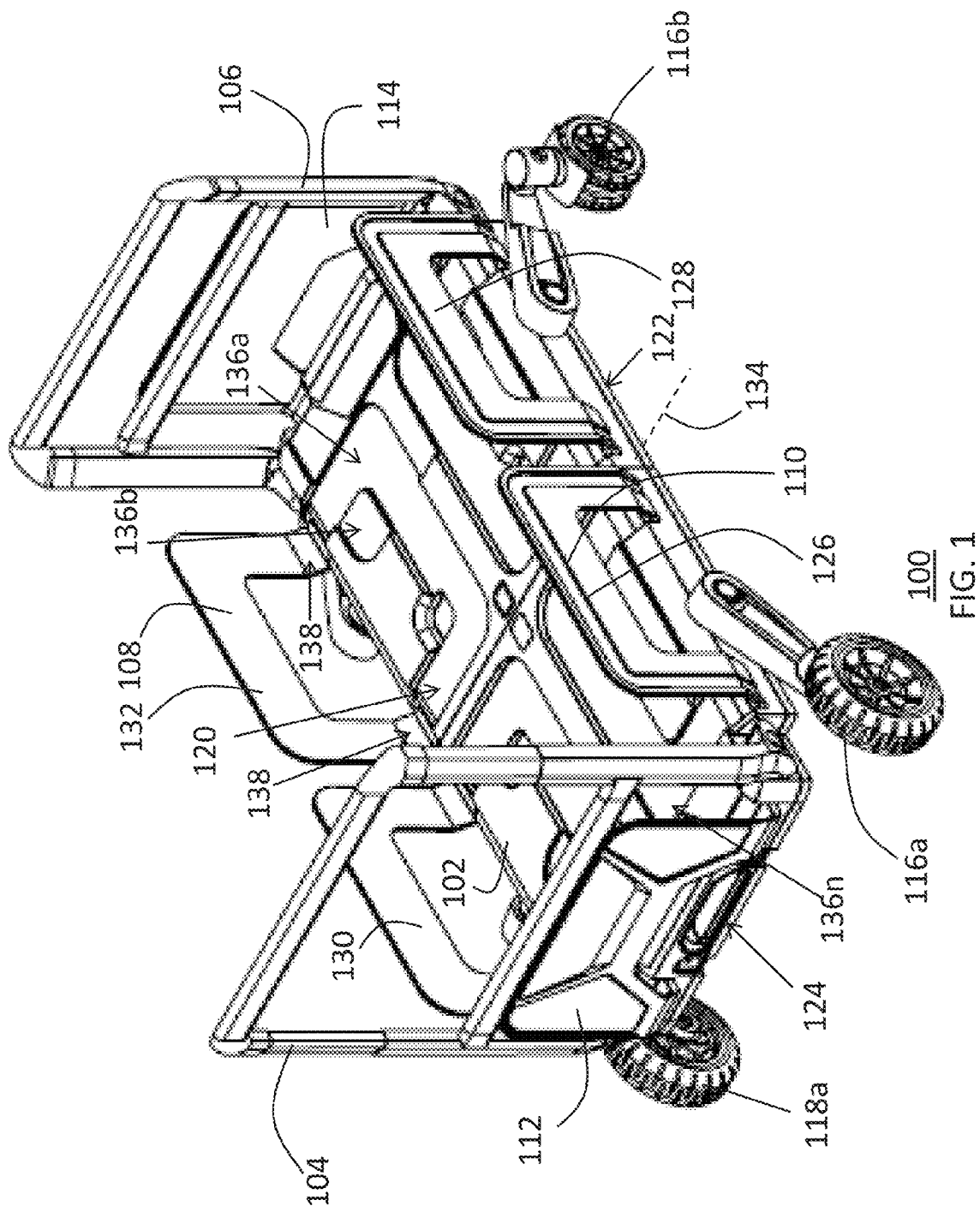

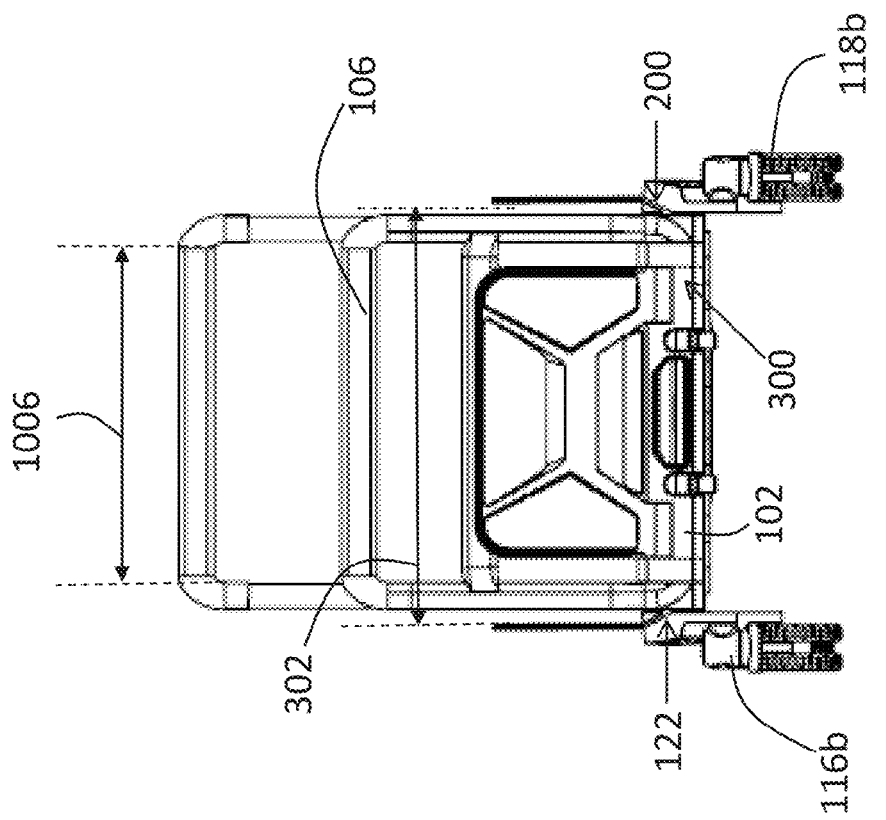
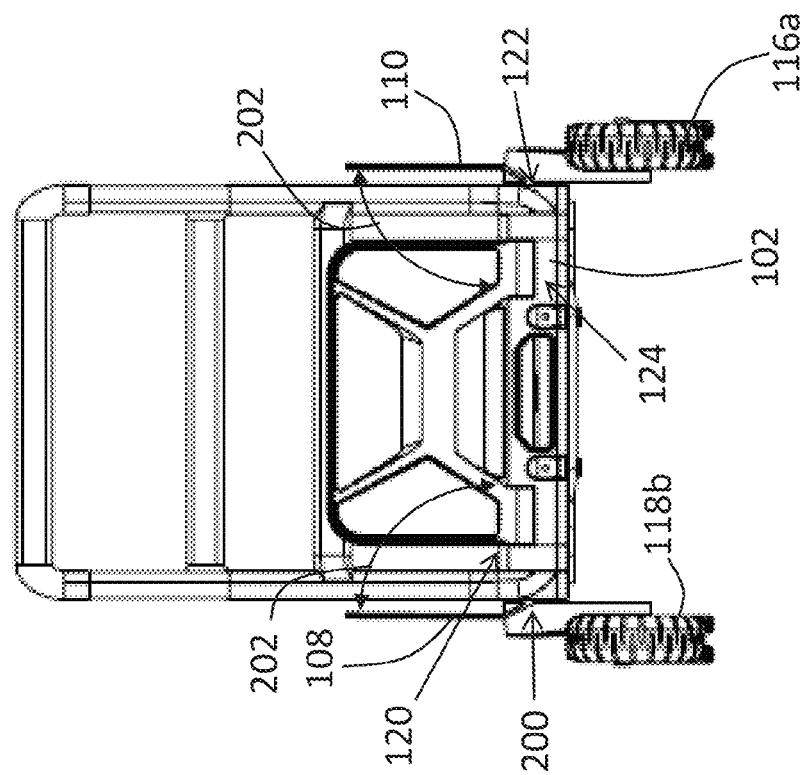

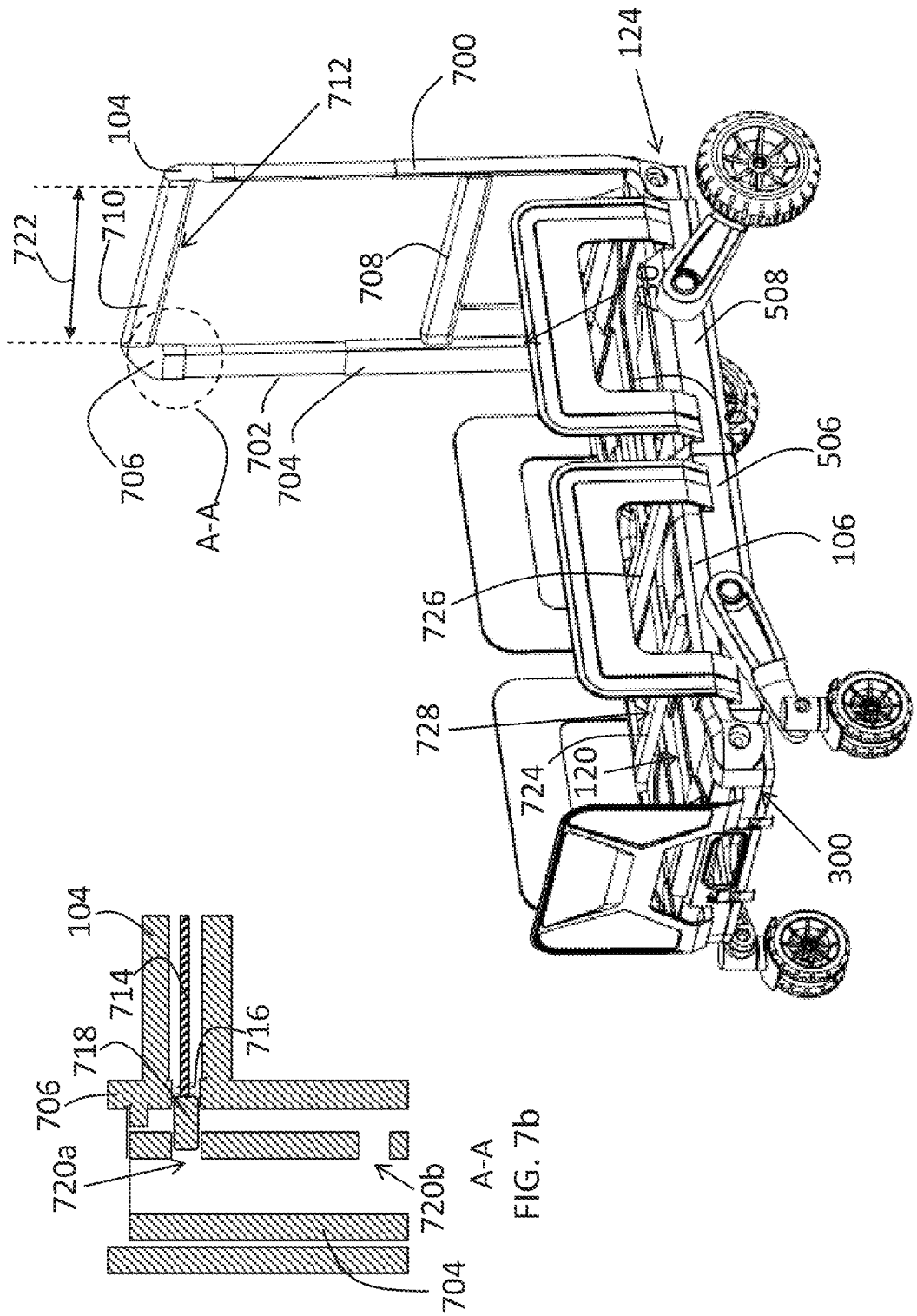

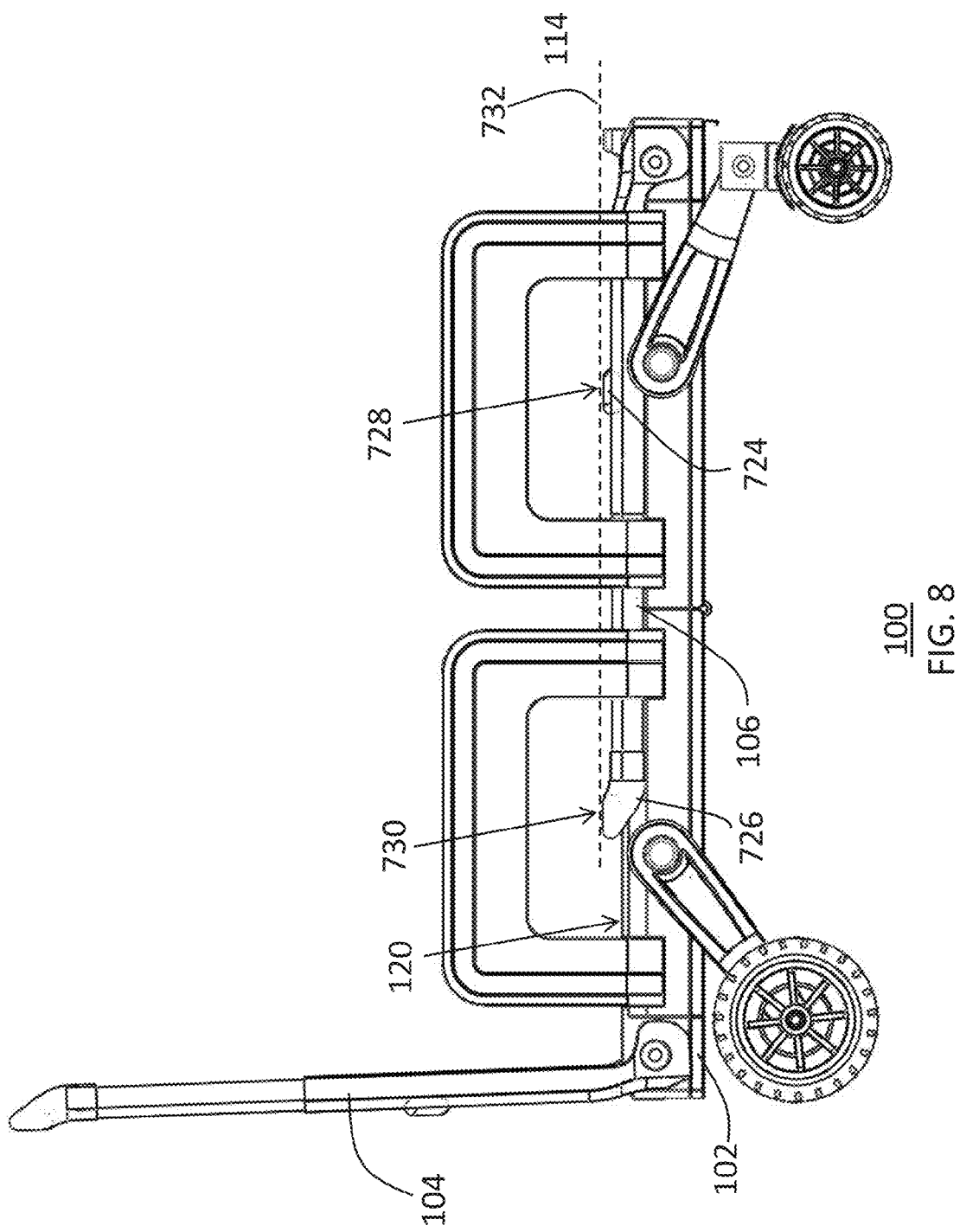

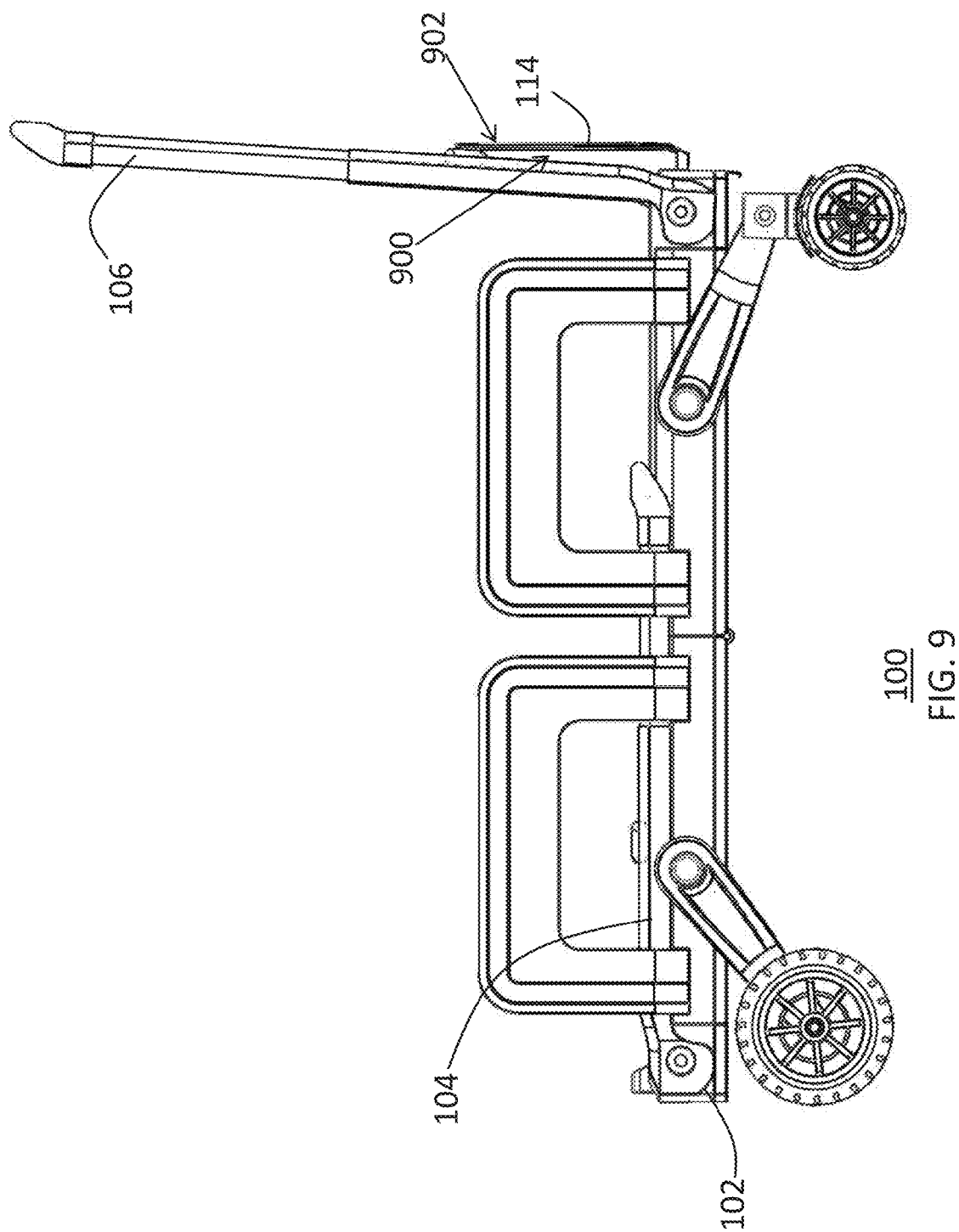

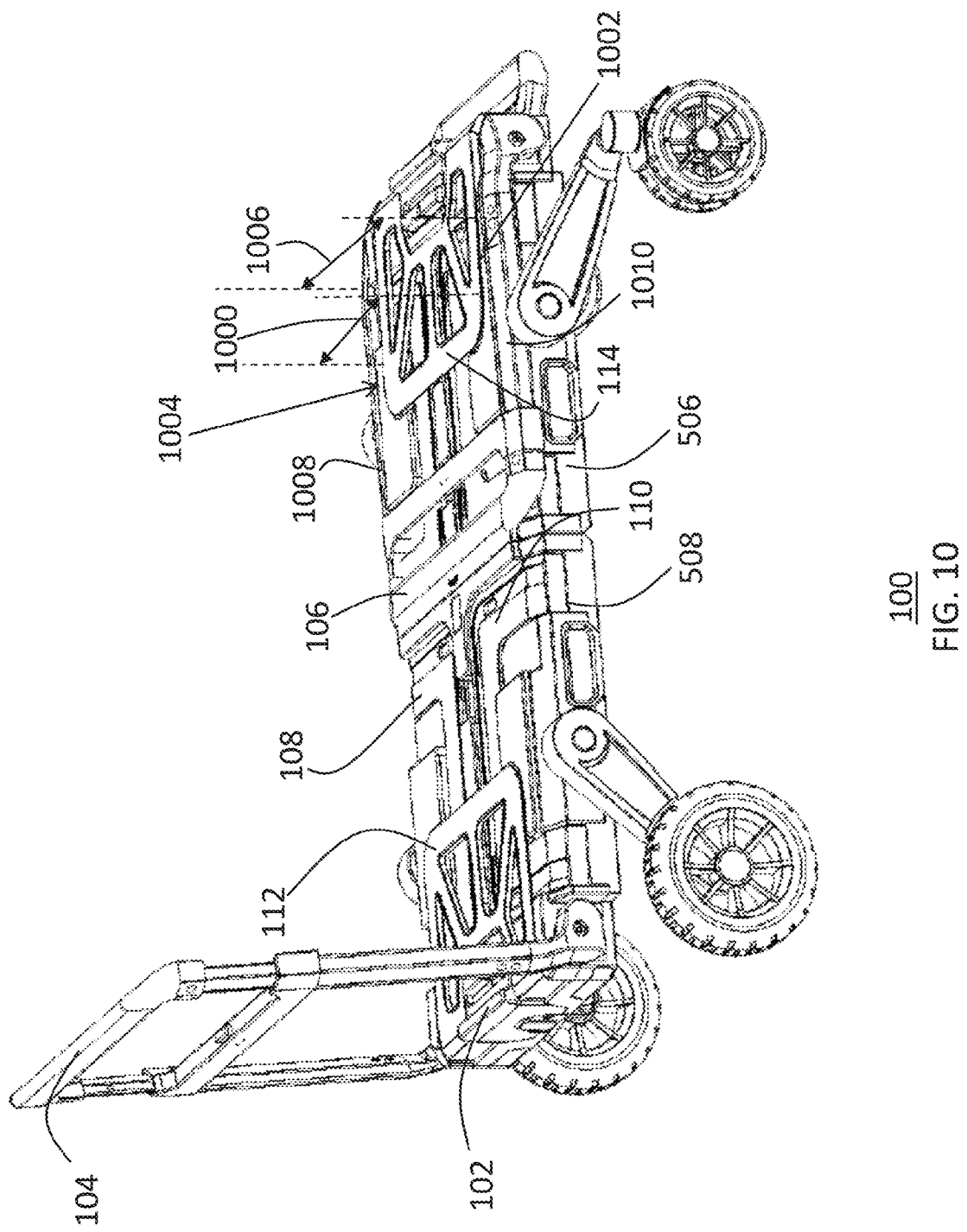

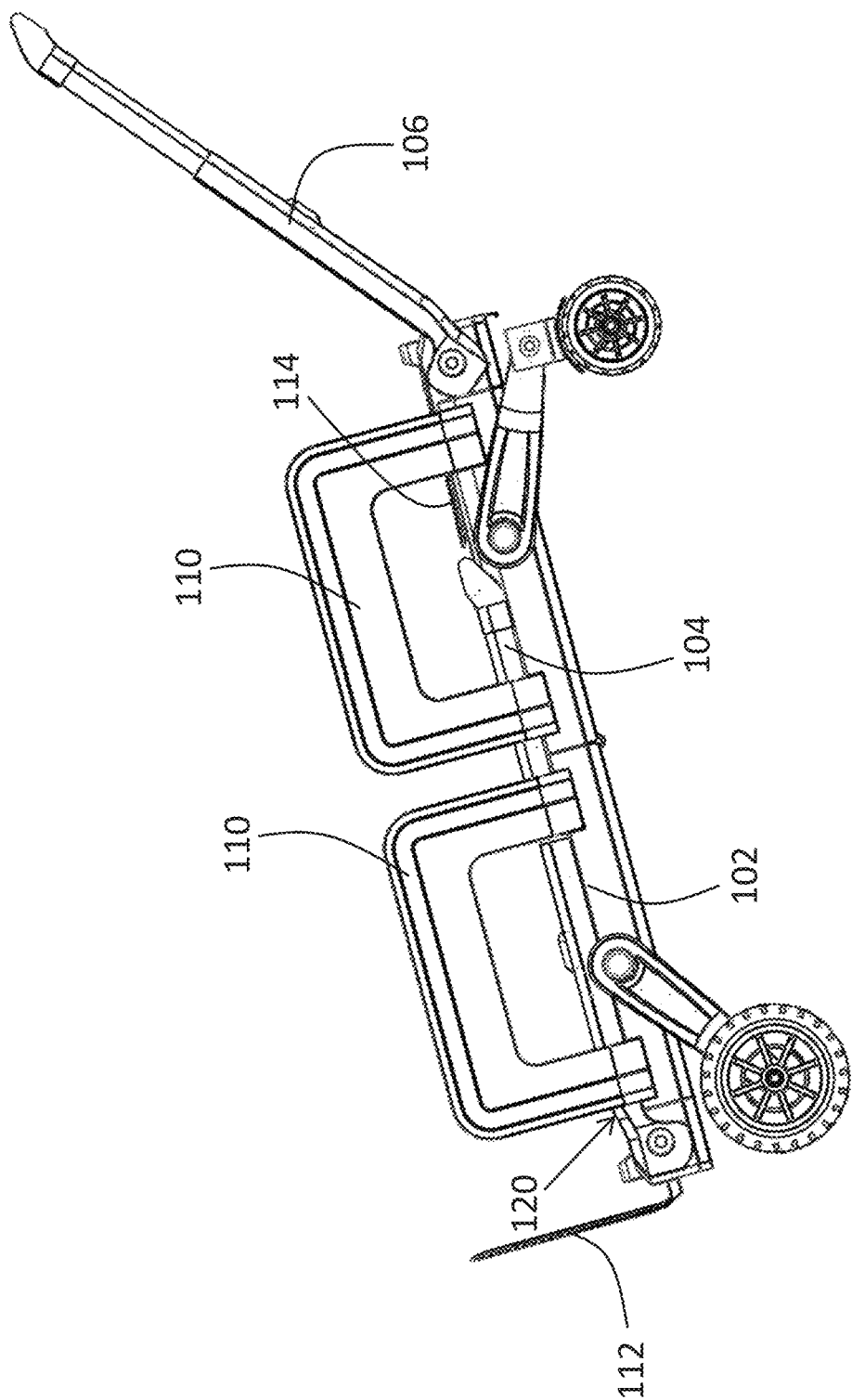

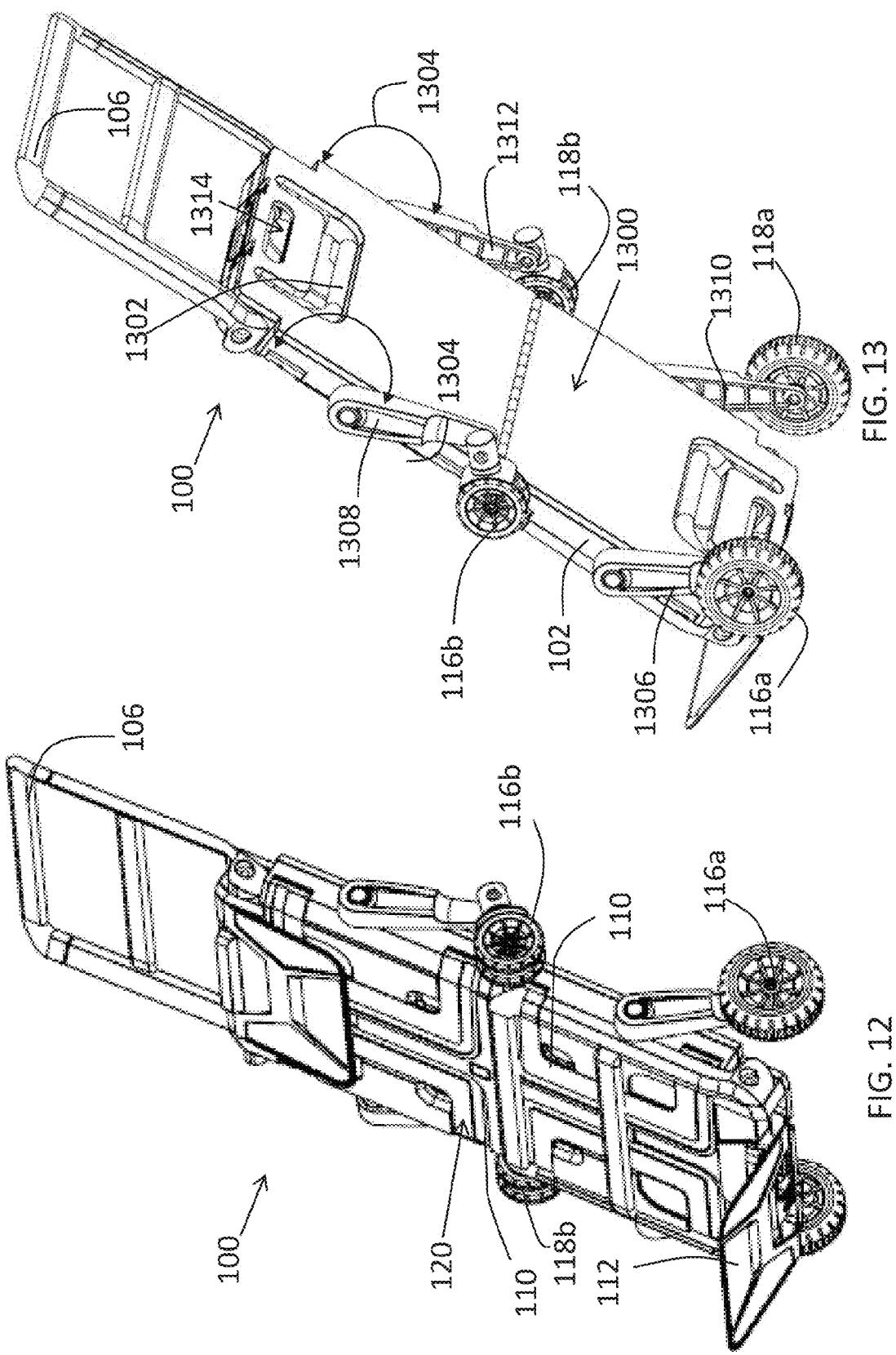

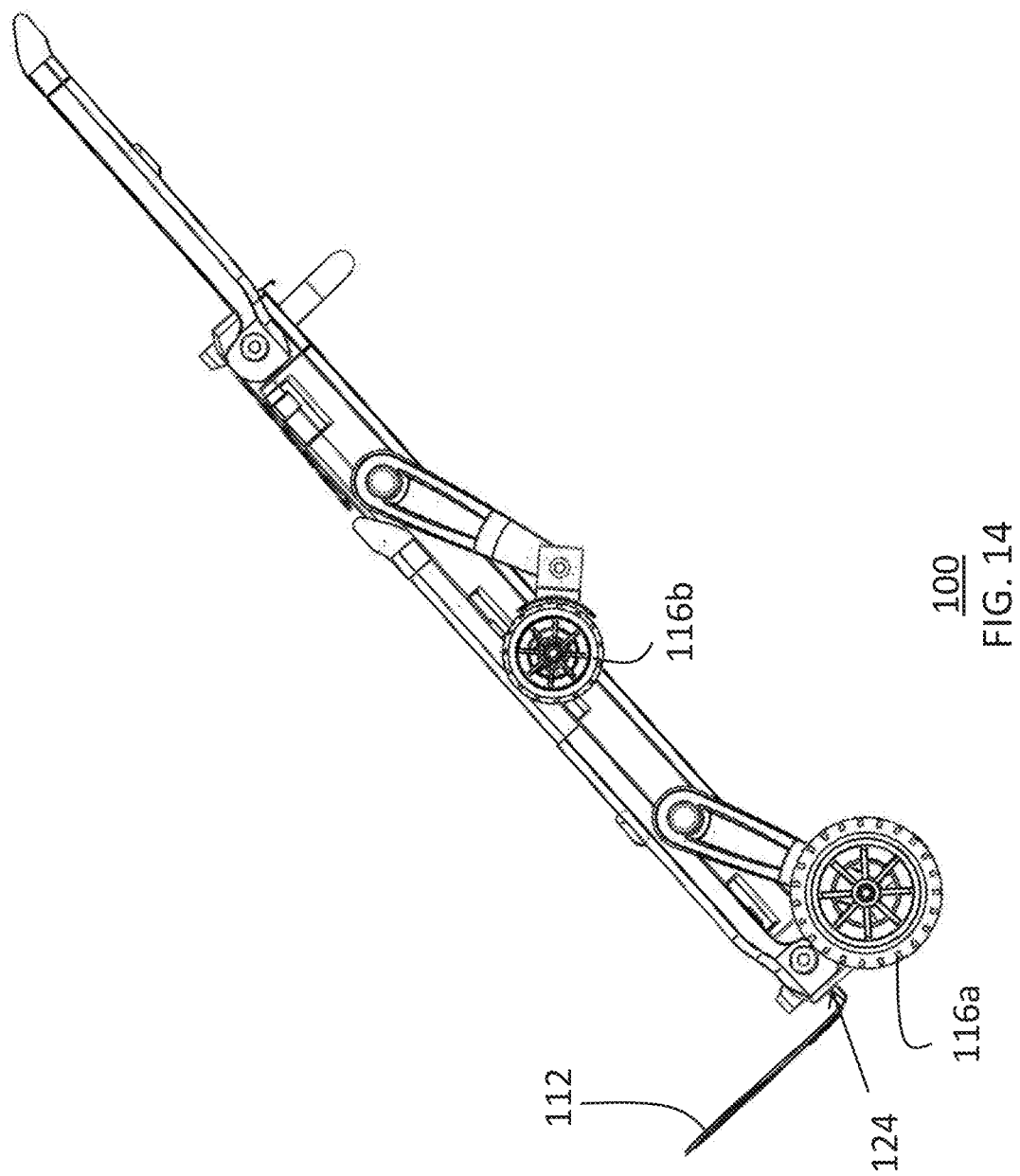

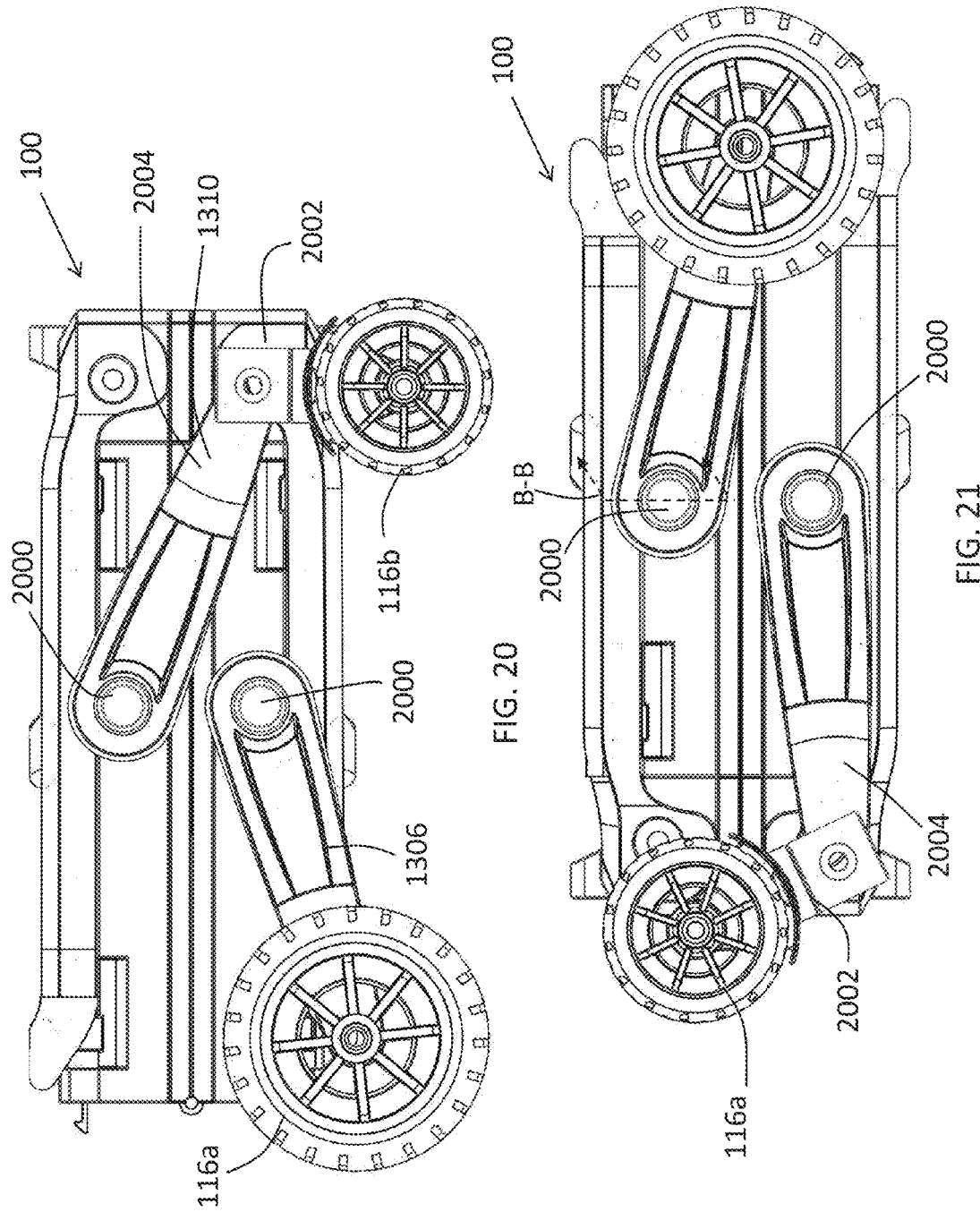

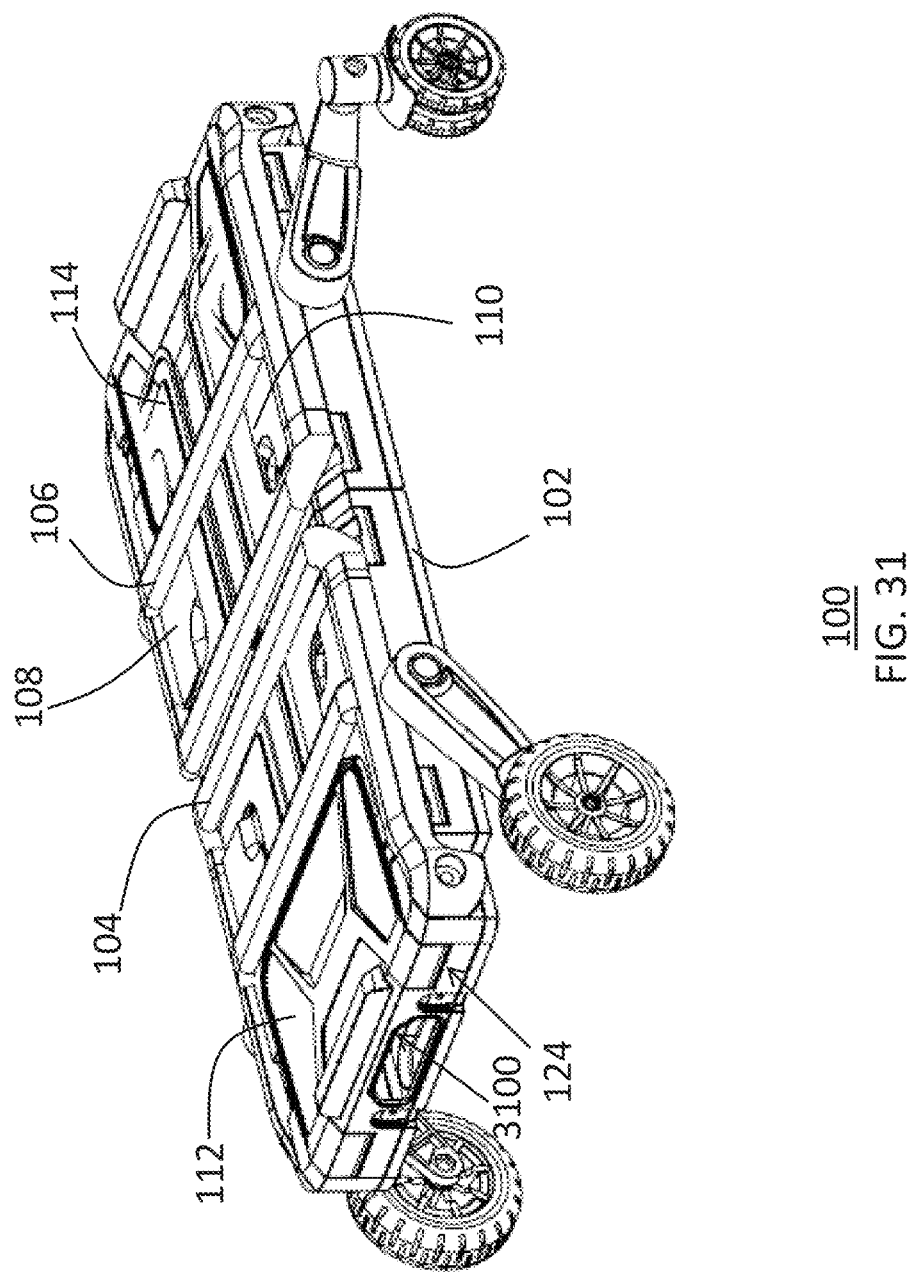

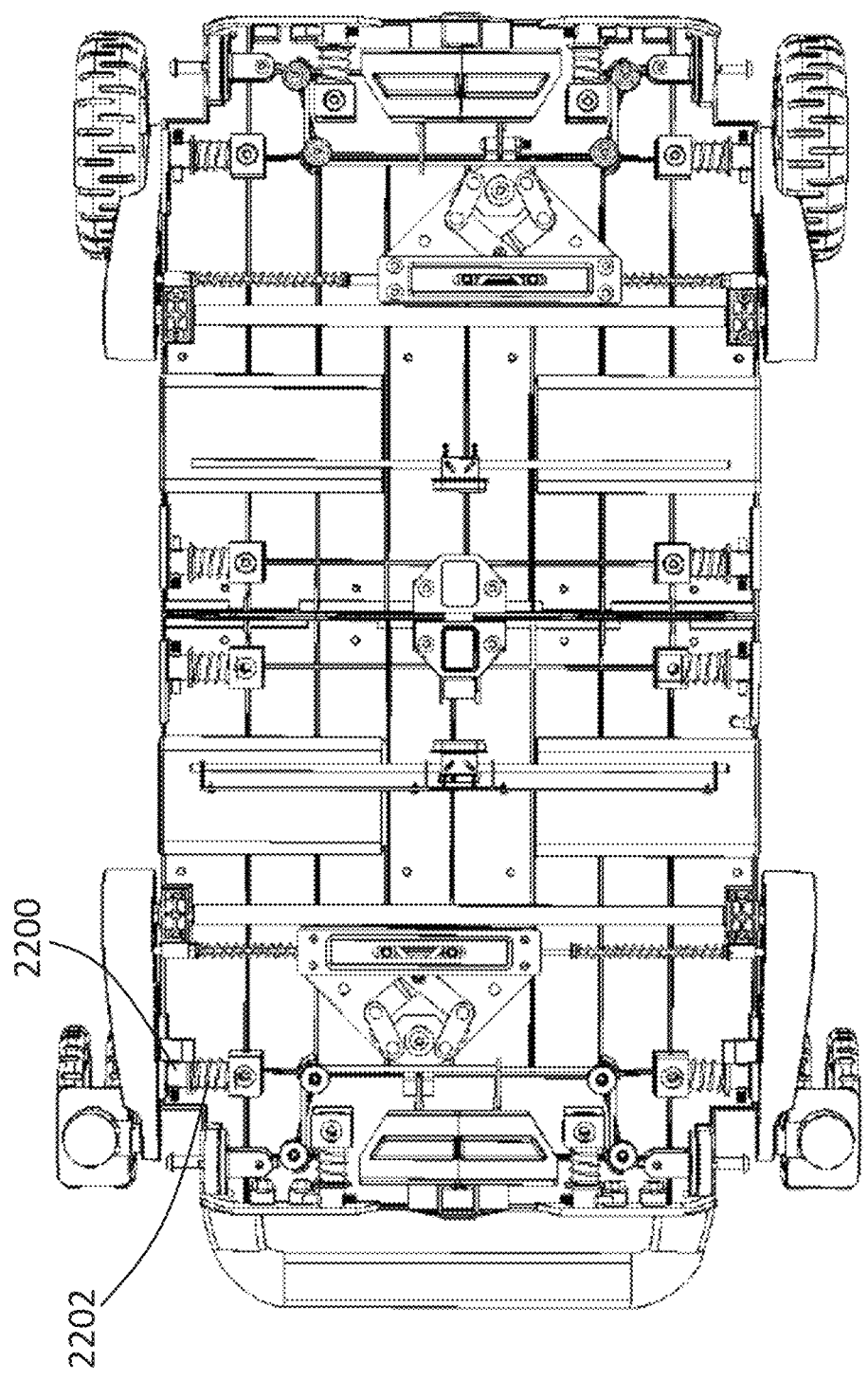

TRANSFORMATIVE HAND CART

FIELD OF THE INVENTION

The present invention relates generally to hand carts and hand trucks, and, more particularly, relates to a device transformable from a hand cart to a hand truck.

BACKGROUND OF THE INVENTION

Having a device, more specifically a hand truck or hand cart, that facilitates users in efficiently and effectively transporting items or their personal property is desired. This is especially relevant when the user desires to transport more than one item or a heavy time can often cause significant physical strain on a user. It can also be very a time-intensive task. Hand trucks are highly desired by many users because they increase the mechanical advantage typically experienced by users without these devices. Due to the size and weight of many of those known hand carts or hand trucks, many users do not utilize them, only utilized them in certain occasions when most pragmatic, or only use one of these devices when another is more appropriate or more efficient because the user can only afford one of them. Many users are looking for a single fully ergonomic and transformative hand cart assembly that can be used in a variety of environments and for a variety of applications.

Convertible, or multifunctional, carriers are known in the art. However, all suffer from various limitations and most are transformable only from one type of carrier to a second type of carrier with limited versatility. For example, there are hand trucks, typically used in a substantially vertical orientation, which are convertible to a horizontally oriented four-wheel trolley. Such combinations, however, lack other features such as rails or panels that would convert the vehicle to be used as a four-walled cart or wagon. Therefore, they would not inhibit items from falling out of or otherwise exiting the cart involuntarily. If a cart/wagon configuration is possible, one has to manually insert or remove side rails, which is cumbersome and inconvenient for the user.

Other multifunctional carriers require wheels to be removed or added depending on the desired configuration. Some flatbed-style carriers convert to a cart/wagon with raisable sides but lack the convenience of telescoping and rotatable side rails and are not adaptable to a hand truck configuration. Other carriers lack the versatility of having multiple and independently retractable or telescoping handles/rails that can be operably placed both in a working position that retains the carrying contents and a storage position that discretely stores the handles/rails without jeopardizing the functionality of the assembly.

Therefore, a need exists to overcome the problems with the prior art as discussed above.

SUMMARY OF THE INVENTION

The invention provides a transformative hand cart that overcomes the hereinafore-mentioned disadvantages of the heretofore-known devices and methods of this general type and that provides users the ability to modify the present invention from a compact storable unit to a hand cart and to a hand truck.

Although the invention is illustrated and described herein as embodied in a transformative hand cart, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cart body when in the extended position.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is a downward-looking perspective view of a transformable hand cart assembly with its components in an operating position to emulate a platform hand cart with side guards in accordance with one embodiment of the present invention;

FIG. 2 is an elevational front view of the assembly of FIG. 1;

FIG. 3 is an elevational rear view of the assembly of FIG. 1;

FIG. 7a is a downward-looking perspective of the assembly of FIG. 1 with one handle member in a storing position in accordance with an embodiment of the present invention;

FIG. 7b is a cross-sectional close-up view of the section A-A in FIG. 7a;

FIGS. 8 and 9 are side elevational views of the assembly of FIG. 1 in two configurations in accordance with an embodiment of the present invention;

FIG. 10 is a downward-looking perspective view of the hand cart assembly of FIG. 1 with one handle member in an operating position to emulate a platform hand cart with no side guards, in accordance with another embodiment of the present invention;

FIG. 11 is a side elevation view of the assembly of FIG. 1 in an arrangement emulating a hand truck in accordance with an embodiment of the present invention;

FIGS. 12-13 are perspective views of the assembly of FIG. 1 in an arrangement emulating a hand truck in accordance with an embodiment of the present invention;

FIG. 14 is a side elevation view of the assembly of FIG. 1 in an arrangement emulating a hand truck in accordance with an embodiment of the present invention;

FIGS. 20-21 are elevational side views of the assembly of FIG. 1 in a folded position in accordance with an embodiment of the present invention;

FIG. 31 is a downward-looking perspective view of a hand cart assembly of FIG. 1 in an extended position and arrangement emulating a dolly in accordance with another embodiment of the present invention; and FIG. 32 is fragmentary top view exposing the inner components of the body of the hand cart assembly of FIG. 1.

DETAILED DESCRIPTION

Figure 4:
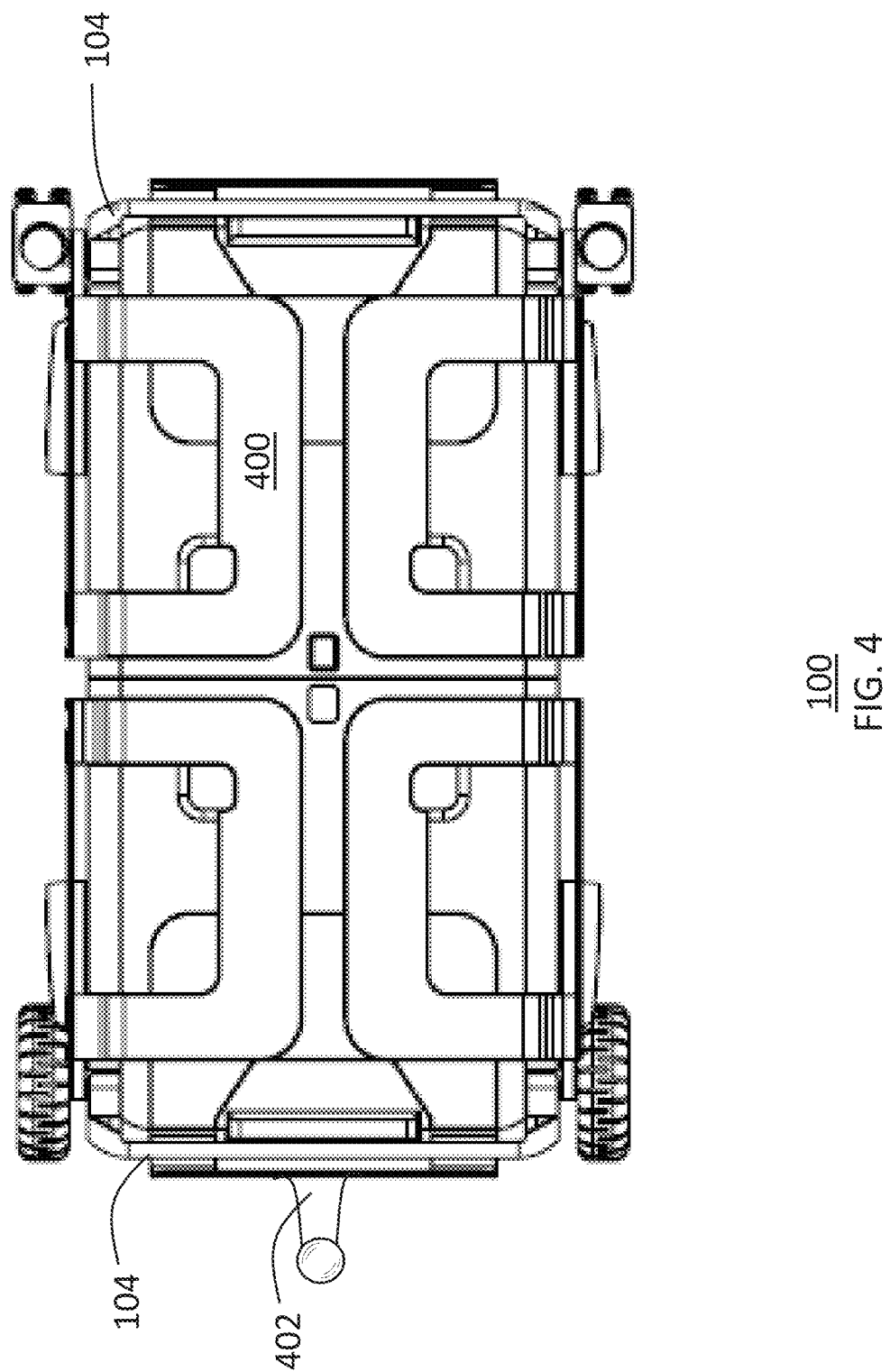
FIG. 4 is a top plan view of the assembly of FIG. 1 with left and right support rails in a storing position.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient transformative hand truck assembly that provides the ability for a user to ergonomically manipulate the assembly so as to reduce its size from a device that is easily storable and transportable to varying embodiments of a hand cart applicable for various applications of use. Embodiments of the invention provide a hand truck assembly that can transform from a "dolly," to a small hand cart used to carry and transport items such as files, to a platform cart for carrying larger items, to a hand truck used to move furniture. Said another way, the present invention provides a transformative hand cart assembly with varying configurations that increase that effectively and efficiently increase the mechanically advantage available to a user.

Referring now to FIG. 1, one embodiment of the present invention is shown in a downward-looking perspective view. FIG. 1 shows several advantageous features of the present invention, but, as will be described below, the invention can be provided in several shapes, sizes, combinations of features and components, and varying numbers and functions of the components. The first example of a transformative hand cart 100, as shown in FIG. 1, includes a cart body 102, handle members 104, 106, support rails 108, 110, end support members 112, 114, and a first and second plurality of wheels 116*a-b*, 118*a-b* (118*b* depicted in FIG. 3). FIG. 1 depicts one embodiment of the hand truck assembly 100 in an operating position, while FIG. 22, for example, depicts the assembly 100 in a storing position.

FIG. 1 specifically depicts the assembly 100 configured in a arrangement that emulates a platform hand cart having side barriers substantially spanning the periphery of an upper surface 120. One advantageous feature of the present invention is that one or more portions of the components, e.g., handle 104, in the assembly 100 are operable to be independently translatable, i.e., move, into various positions to create arrangements emulating various hand carts or dollies. To facilitate in the effective creation of these various arrangements, in addition to facilitating storage of the assembly 100, the body 102, more specifically the upper surface 120, has recesses employed to conceal or position certain components of the assembly 100 in various arrangements or in the storing position.

With reference to FIGS. 1-6, the assembly 100 also includes a bottom surface 1300 (shown in FIG. 13), a left side 200, a right side 122 opposite the left side 200 of the cart body 102, a first end 124, and a second end 300 opposite the first end 124 of the cart body 102. As discussed in more detail herein, in some embodiments of invention, the first and second handle members 104, 106, the left and right support rails 108, 110, and the first and second end support members 112, 114 are translatably coupled to the body 102 so as to move into various positions. In one embodiment, the first handle member 104 is coupled to the first end 124 of the cart body 102 and the second handle member 106 is coupled to the second end 300 of the cart body 102. Said another way, the one or more portions of the first and second handle members 104, 106 may be coupled relative to the terminal end of the upper surface 120 of body 102 or within approximately 6 inches of the terminal end of the upper surface 120 of the body 102. In some embodiments of the present invention, the assembly 100 may utilize only one of the handle members 104, 106, in which case some arrangements may not be able to be utilized.

Figure 5:
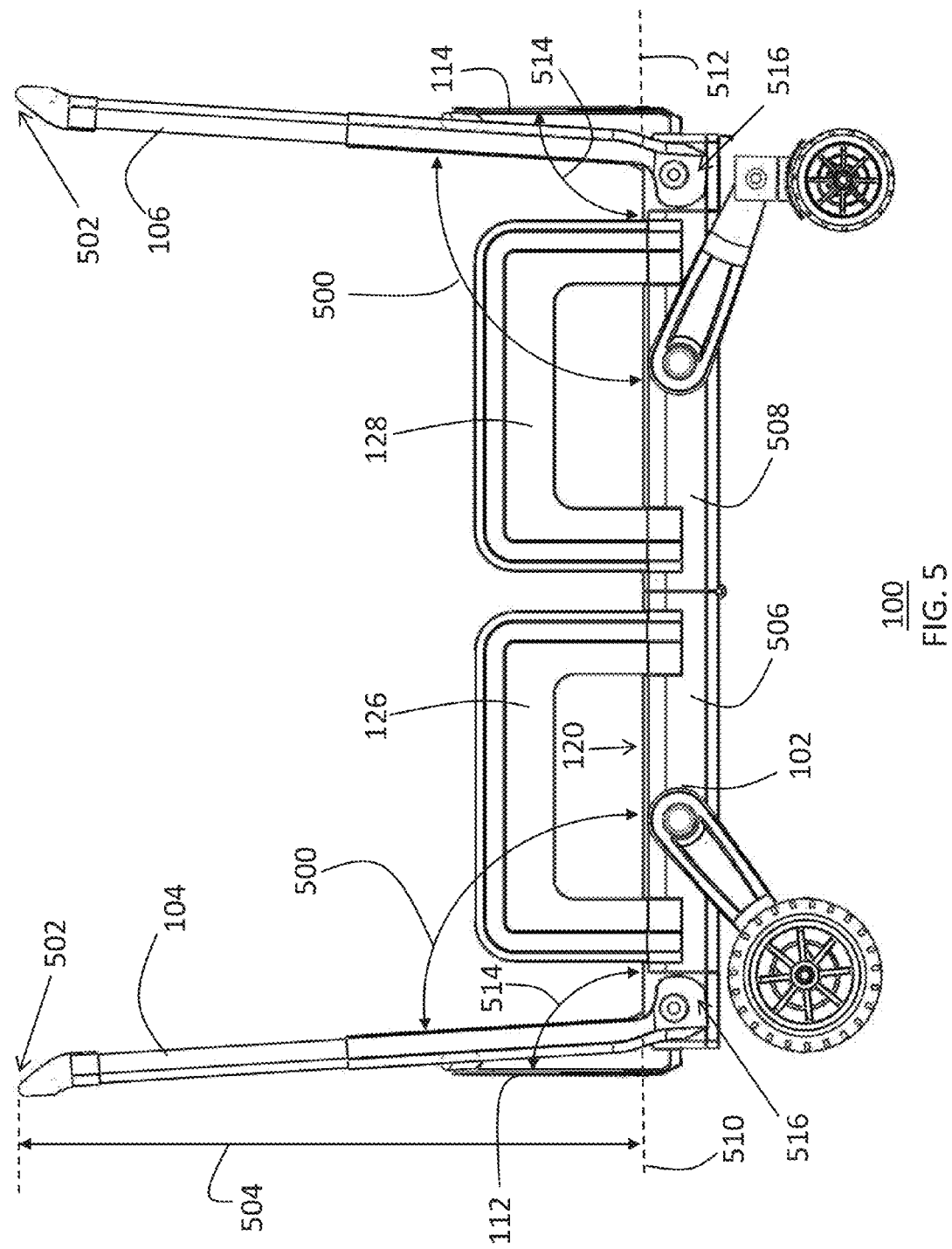
FIG. 5 is an elevational right side view of the assembly of FIG. 1.

As depicted in FIGS. 1-6, specifically FIG. 5, the first and second handle members 104, 106 are placed in an exemplary operating position along a handle translation path (indicated with the arrow 500) with a distal end 502 of the first and second handle members 104, 106 disposed a distance away, e.g., distance 504, from the cart body 102. This distance 504 will vary based on where, in the handle translation path 500, the first and second handle members 104, 106 are located. For the handles be "a distance" away from the body 102 it should be a value greater than approximately 2-4 inches. As appreciated by those of skill in the art, when the translation path 500 is semi-circular with respect to the body 102, the apex of the value of the distance 504 will be when the handle members 104, 106 are in an erect position, or perpendicular with respect to the upper surface 120 or other surface the body 102. The distance 504 will also be at least partially dependent on the length of the handle members 104, 106.

Figure 15:
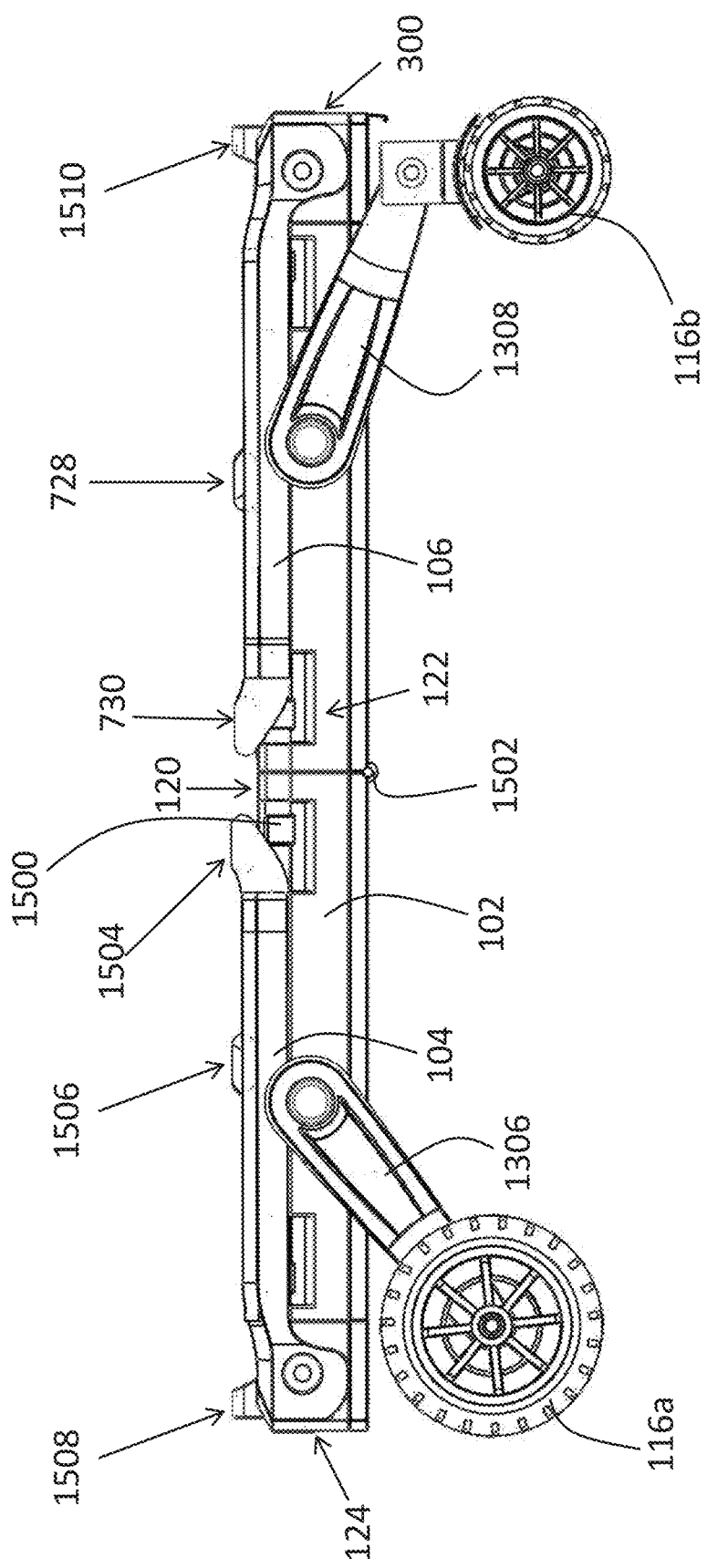
FIG. 15 is a side elevation view of the assembly of FIG. 1 in an arrangement emulating a dolly in accordance with an embodiment of the present invention.

In other embodiments, the first and second handle members 104, 106 are placed in the operating position whether they are either placed in a substantially perpendicular orientation with respect to the upper surface 120 of the body 102 (e.g., FIG. 5), the bottom surface 1300 of the body 102 (not shown), or the surfaces at the ends 124, 300 of the body 102 (e.g., FIG. 14). The term "substantially perpendicular" is defined as 90° (+/−15°) of a referencing object or surface. As depicted in FIG. 11, for example, the first and second handle members 104, 106 may be placed in other various other angular positions (e.g., 45°, 135°, 180°, 225°, or 270°) relative to the upper surface 120 (or a plane defined by the upper surface 120) of the body 102. With brief reference to FIGS. 15 and 16, the first and second handle members 104, 106 may be in the "storing position" when they are at least partially recessed into the body 102. Said another way, they are in a storing position when a portion of the handle members 104, 106 are below the upper surface 120 of the body 102, yet still accessible from the upper surface 120 of the body 102. The handles 104, 106 are preferably placed in the storing position at the lateral sides of the body 102, interposed between the wheels 116a-b, 118a-b of the assembly 100 and the end members 112, 114 as depicted in FIG. 15.

The handle members 104, 106 include a proximal end 516 that may be rotatably coupled to the body 102 using a fastener, e.g., a spring or "U" clip. In one embodiment, the proximal ends 516, or knuckles, have apertures sized to individually receive a bar or rod upon which the knuckle rotates. The rod or bar may extend across the entire width 600 (shown in FIG. 6) of the cart body such that the rod or bar may be utilized as a pivot for another component, e.g., end member 112, or may not extend the entire width 600.

Figure 6:
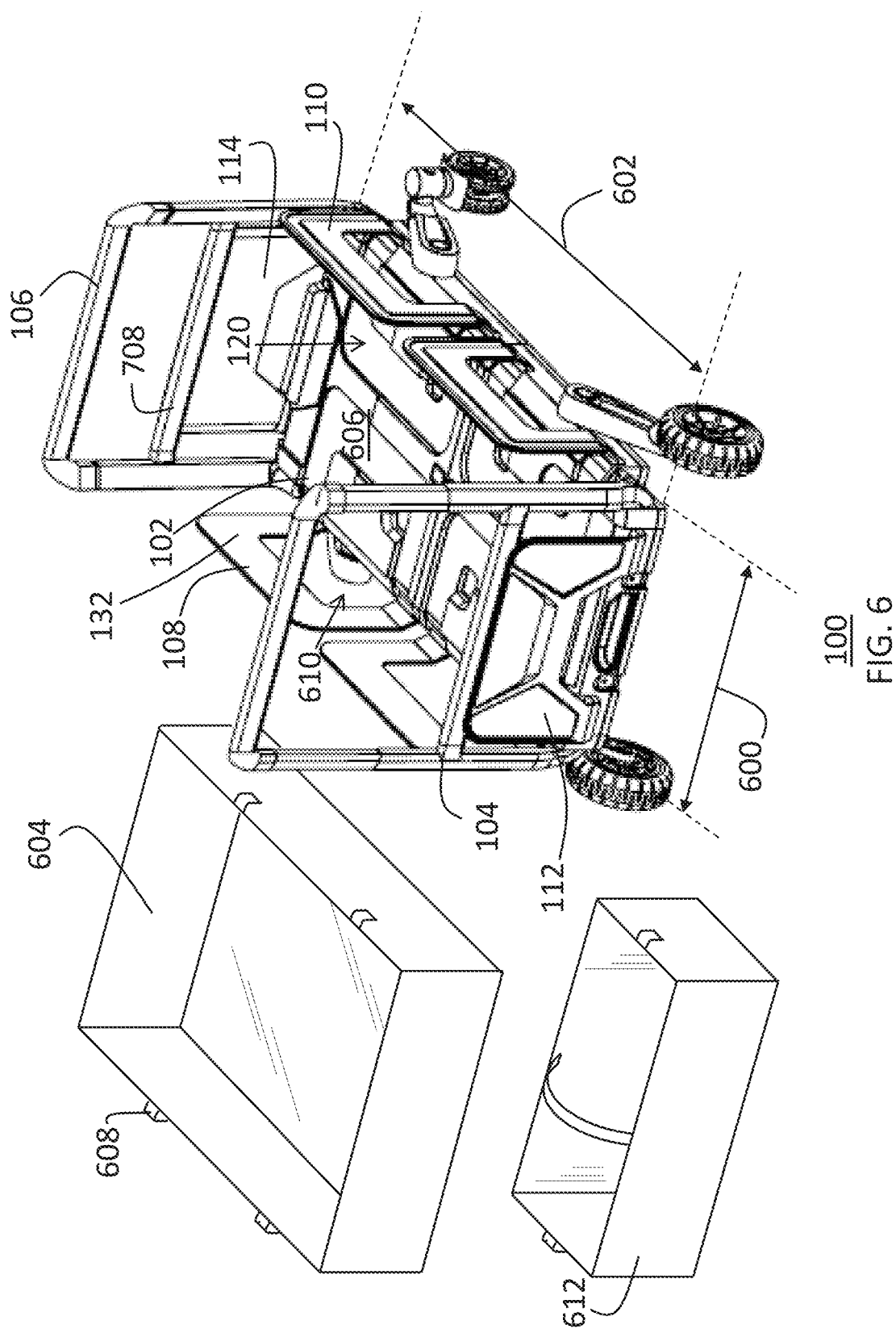
FIG. 6 is a downward-looking perspective view of the assembly of FIG. 1 with insertable containers available for insertion within the assembly in accordance with an embodiment of the present invention.

FIG. 6 also depicts an exemplary insert or liner 604 removed from the assembly 100. The insert 604 is shaped to be received by the area 606 defined by the end members 112, 114, the handle members 104, 106, and the side rails 108, 110. The liner 604 advantageously prevents loose or small articles desired to be carried by the assembly 100 from falling through apertures or other open areas defined by the components 104, 106, 108, 110, 112, 114. In one embodiment, the liner 604 utilizes one or more clips 608 that grasp onto one or more of the components 104, 106, 108, 110, 112, 114. The insert 604 may use other fasteners without deviating from the spirit and scope of the present invention. For example, the clips 608 shown in FIG. 6 are shaped to receive an upper portion of the side rails 108, 110. The clips 608 may also be placed on various other portions of the insert 604 to enable it to be attached other components on the assembly 100, e.g., the handle members 104, 106 or end members 112, 114. Alternatively, the liner 604 may also have portions shaped and size to contour and to be inserted within open apertures, e.g., aperture 610 formed by guard member 132, so as to provide a secure fit with the assembly 100. To install the liner 604 with contour portions, one of the rail members 108, 110 will be rotated away from the body 102, e.g., 120° from the upper surface 120, and then moved back into the position as shown in FIG. 6. The insert 604 may be formed in various other shapes and sizes to accommodate other arrangements contemplated by the present invention, e.g., the compact hand cart assembly 100 shown in FIG. 18 or 19.

FIG. 6 can also be seen having an exemplary carrying bag or container 612 that may be shaped to be inserted, along one or more bags 612, within the insert 604 to advantageously provide users the ability to transport or store articles independent of one another. One beneficial application of utilizing the bags 612 includes shopping for groceries at a food market. For example, a user may transport the assembly in its folded position to the food market where it is transformed into the hand cart or wagon shown in FIG. 6 and the insert 604 and/or bags/containers 612 are inserted therein. Although the bags 612 may be shaped to snugly fit within the liner 604, in other embodiments the bags 612 may have one or more clips 614 that may enable them to couple with the liner 604 or components associated with the assembly 100, e.g., components 104, 106, 108, 110, 112, 114. The bags 612 and/or insert 604 may also include other advantageous features such as handles, insulating liners, drawstrings (e.g., for laundry), and lids and/or tops. As mentioned, the liner 604 and/or bags 612 may have various heights, shapes, and sizes depending on various applications. In one embodiment, two or more inserts 604 are utilized, wherein the inserts 604 stack on one another (with or without tops/lids) and/or are coupled to various components associated with the assembly 100, e.g., components 104, 106, 108, 110, 112, 114.

Alternatively, the assembly 100 may use one or more level creation members that extend longitudinally across the length 602 of the assembly and create a support surface to stack another liner 604 or bags 612 therein, thereby creating staggered heights to store items. In one embodiment, the level creation members attached to one or more portions of the handle members 104, 106. In other embodiments, the level creation members couple to another component associated with the assembly 100, e.g., components 104, 106, 108, 110, 112, 114. The level creation members may also have an enclosed surface thereon to provide UV and rain protection to the contents or articles transported within the area 606 by the assembly 100. The assembly 100 may also have an umbrella post with an extendable umbrella or a post adapted to receive an umbrella. This umbrella post may be coupled or couplable to the handle members 104, 106 in one embodiment, but may be coupled to or couplable to other components in the assembly in other embodiments. In another embodiment, when one or more of the handle portions, e.g., portion 706 shown in FIG. 7a, are removed, the female portion, e.g., 704 shown in FIG. 7a, serves as the umbrella post. The umbrella post provides users the ability to attach an umbrella thereto so as to also provide UV and rain protection from the outside environment when utilizing the assembly in transport or when parking the assembly at an area such as the beach or park.

While the container 612 and/or liner 604 have been discussed as being used in or above the area 606 defined by the assembly 100, in other embodiments, one or more containers 612 and/or liners 604 may be attached to the assembly 100 and disposed outside of the area 606, e.g., on a cross member 708 of the handle member 106, such that the assembly emulates a shopping cart by provide another storage compartment or provides an area for a child to be held. The liner 604 or container 612 may be hard plastic or other material and may be collapsible for easy storage and transport. To facilitate transport and provide comfort to children or fragile articles carried by the liner 604, bags 612, or the upper surface 120 of the body 102, the same may be lined with a padded material, e.g., neoprene, cotton, or another fibrous and/or artificial material. In one advantageous embodiment, the padded material may be utilized in connection with the arrangement shown in FIG. 18 (e.g., the upper surface 120 of the body 102 and/or the inner surface 1804 of the handle member 106 will be padded) to provide a user the ability to use the assembly as a seat in a beach or park environment, for example. Beneficially, the umbrella post in connection with an umbrella would provide comfort and protection to the user from UV and rain generated by the outside environment.

Referring specifically to FIG. 2, the hand cart 100 can also be seen with a left support rail 108 and a right support rail 110 coupled to the left and right sides 200, 122, respectively, of the body 102. In other embodiments, the rails 108, 110 may extend from an upper surface 120 or bottom surface 1300 of the body 102. The left and right support rails 108, 110 can be seen having a storing position (e.g., in FIG. 12) and an operating position (e.g., in FIG. 5) along a rail translation path 202. Similar to the handle members 104, 106, the storing position of the rails 108, 110 includes the left and right support rails 108, 110 at least partially recessed into the upper surface 120 of the body 102. The operating position of the rails 108, 110 may include the left and right support rails 108, 110 disposed at a substantially perpendicular orientation to the upper surface 120 of the cart body 102, as shown in FIG. 2.

Similar to the handle members 104, 106, the left and right support rails 108, 110 may be placed in other various other angular positions (e.g., 45°, 135°, 180°, 225°, or 270°) relative to the upper surface 120 (or a plane defined by the upper surface 120) of the body 102. In one embodiment, each of the side rails 108, 110 may be composed of two independent rails 126, 128, 130, 132 as shown in FIG. 1. Said another way, the left support rail 108 consists of a plurality of support rails 130, 132 and the right support rail 110 consists of a plurality of support rails 126, 130. Advantageously, each of these rails 126, 128, 130, 132 may be independently translated (e.g., rotated) along the rail path 202 to either the storing or operating position to achieve the various arrangements contemplated by the transformative assembly 100. The left and right support rails 108, 110 are configured, when in an operating position, to permit either one, or both, of the handle support members 104, 106 to be placed in the storing position as shown in FIGS. 8 and 11 for example. The left and right support rails 108, 110 may also be configured, when in a storing position, to permit either one, or both, of the handle support members 104, 106 to be placed in the storing position as shown in FIG. 4 for example. This advantageously permits either the handle members 104, 106 to be used as a support surface or to permit the assembly to be placed in the folded position or other arrangements discussed herein. Referring to FIGS. 1-3, the guard members 108, 110 may have contoured and/or recessed portions, e.g., 138, on an inner surface of the guard members 108, 110 to facilitate the storing of the handle members 104, 106. The guard or rail members 108, 110 can also be seen flared outwardly in a storing position such that the width 302 separating the guard rails 108, 110 will accommodate the width 1006 (also shown in FIG. 10) of the handle members 104, 106. As shown in FIGS. 4 and 12, respectively, the guard rails 108, 110 may be placed over one or more handle members 104, 106 when both are in the storing position or the guard rails 108, 110 may be placed under one or more handle members 104, 106 when both are in the storing position to effectuate the various arrangements.

Figure 24:
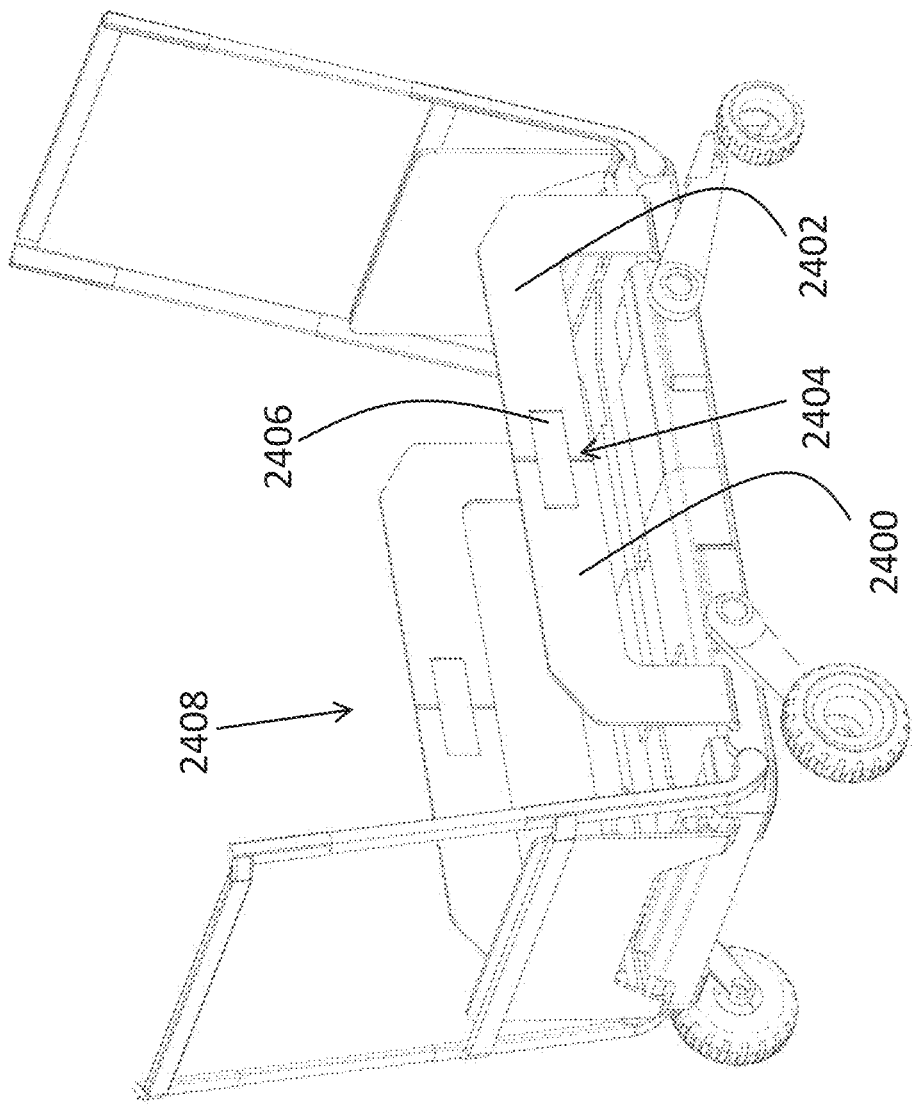
FIGS. 24-25 are downward-looking perspective views of a transformable hand cart assembly in a accordance with another embodiment of the present invention.

With brief reference to FIG. 24, in other embodiments, the rail support members 2400, 2402 are removably couplable together about a joint 2404 with a fastener 2406 (e.g., Velcro, screws, bolts, or magnet). Said another way, when the device 2408 is in the extended position and the support rails 2400, 2402 are desired along the entire longitudinal length 602 (shown in FIG. 6) of the device 2408, each of the support rails 2400, 2402 are coupled together with a fastener. When the device 2408 is in other arrangements, one or more of the support rails 2400, 2402 are placed in the storing position. In preferred embodiments, the a set of rails 126, 130 are attached to one portion 506 of the body 102 and another set of rails 128, 132 are attached to the other portion 508 of the body 102 to create the versatile assembly 100 as discussed herein.

Figure 16:
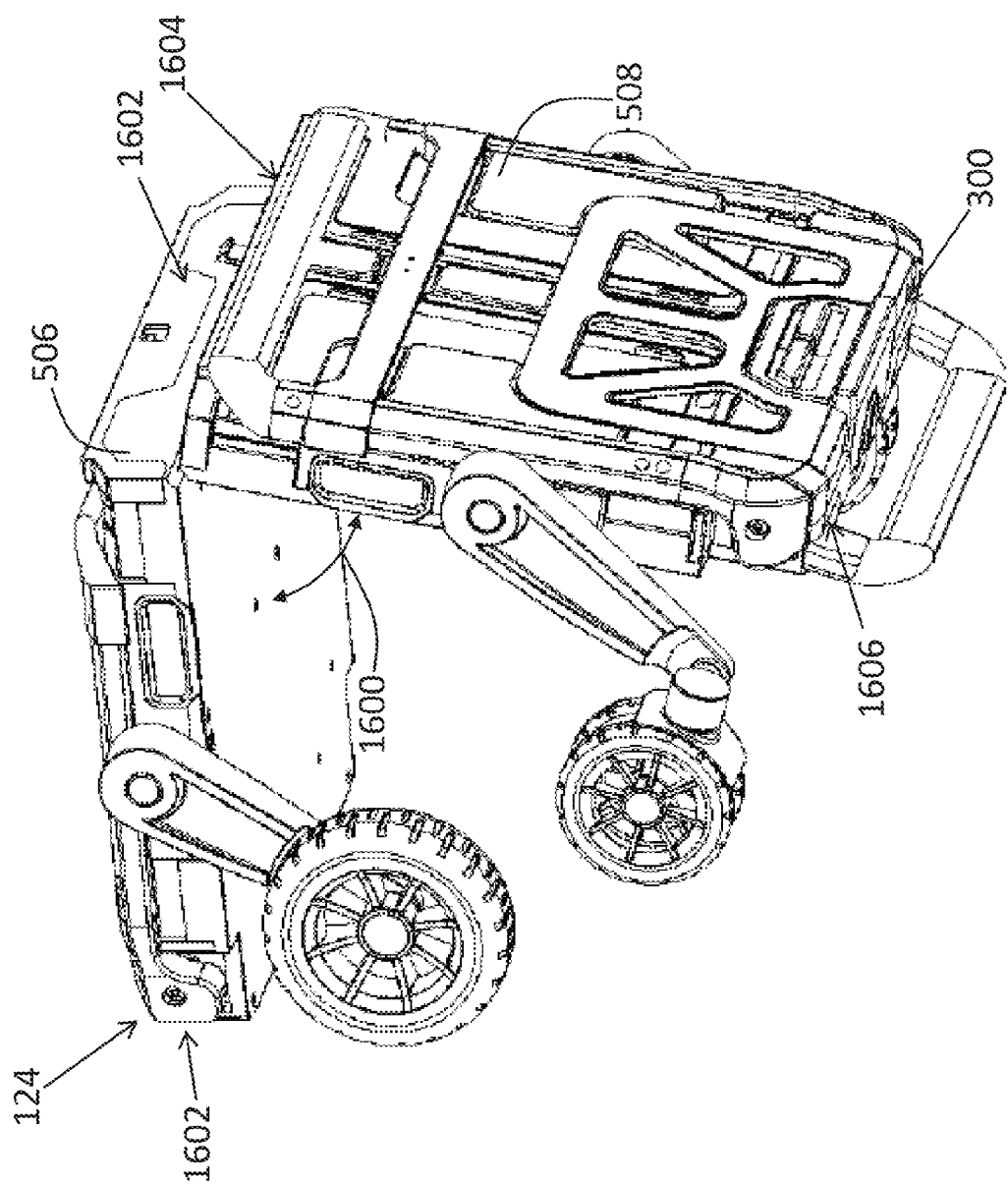
FIG. 16 is a downward-looking perspective view of the assembly of FIG. 16 with the body of the assembly being operably configured to a folded position in accordance with an embodiment of the present invention.

With specific reference to FIGS. 5 and 16, one advantageous feature of the present invention includes the body 102 having two selectively foldable portions 506, 508 that have an extended position (e.g., FIG. 5) along a cart body translation path (indicated with the arrow 1600) and a folded position (e.g., FIG. 17) along the cart body translation path 1600. One embodiment, the portions 506, 508 are selectively foldable by pressing one or more switches mechanically coupled to a locking mechanism used to secure the portions 506, 508 in either the folded or extended positions. With brief reference to FIG. 15, one example includes a slide latch 1500 located on one of the portions 506, 508 that is operably translatable within a channel to a position on the other portions 506, 508. In other embodiments, the portions 506, 508 are selectively foldable by applying a "moment" (i.e., a force over a distance) to one or more of the ends 124, 300, or a location proximal to the ends 124, 300, such that the portions 506, 508 are rotated. Said another way, the portions 506, 508 of the body 102 may be stay in the extended position by the compression force exerted by one or more of the distal ends 1602, 1606 and proximal ends 1600, 1604 of their respective body portions 506, 508 and in the folded position by the weight of the portions 506, 508. Alternatively, the portions 506, 508 may be coupled together with a hinge 1502 (shown in FIG. 15) and may utilize one or more body coupling members 1608 to dictate the body translation path 1600 and/or biasing the position of the body portions 506, 508. Specifically, the coupling members 1608 may be of an elastic material, e.g., rubber, operable to bias the portions 506, 508 in the extended position and deform and/or translate when the portions 506, 508 are moved into the storing position. The hinge 1502 is operably configured to permit the body portions 506, 508 to selectively detach from one another while still remaining coupled to one another.

Figure 17:
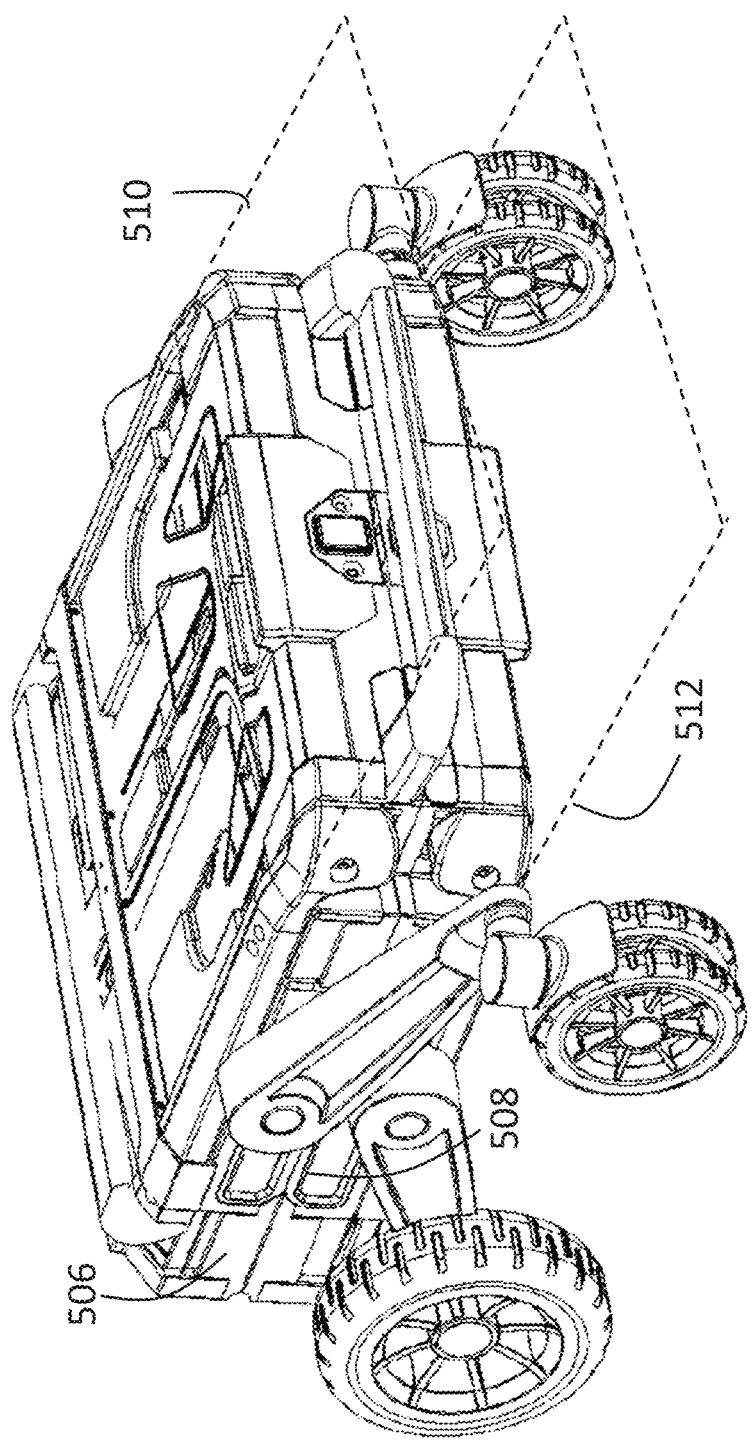
FIG. 17 is a downward-looking perspective view of the assembly of FIG. 1 in a folded position to emulate a compact dolly in accordance with an embodiment of the present invention.

The extended position of the assembly 100 includes the upper surface 120 of the two portions 506, 508 of the cart body 102 coplanar and parallel with each other (as shown in FIG. 5). Said another way, two or more portions of the upper surface 120 of one portion 506 defines a plane (e.g., plane 510) and two or more portions of the upper surface 120 of another portion 508 defines another plane (e.g., plane 512) that lie on the some plane and are parallel. In some embodiments, the same can be said about the bottom surface 1300 of the body 102, i.e., being coplanar and parallel with one another in the extended position). Additionally, when in the folded position (as shown in FIG. 17) the upper surface 120 of the two portions 506, 508 of the cart body 102 are noncoplanar and parallel with each other. In other embodiments of the present invention, the two selectively foldable portions 506, 508 are operably configured to rotate about an imaginary axis (shown in FIG. 1 as 134) spanning through a center of the cart body 102. The "center" of the body 102 may include the median between the first and second ends 124, 300, the center of mass of the body 102, or an axis interposed between the rails 126, 128.

Still referring to FIGS. 1-6, specifically FIG. 5, the assembly 100 can also be seen having the first end support member 112 translatably coupled to the first end 124 of the cart body 102 and the second end support member 114 translatably coupled to the second end 300 of the cart body 102. The first and second end support members 112, 114 can also be seen having a storing position (e.g., shown in FIG. 10) and an operating position (e.g., shown in FIG. 5) along an end support translation path (indicated with the arrows 514). The storing position may include the first and second end support members 112, 114 at least partially recessed into the upper surface 120 of the body 102 and the operating position may include the first and second end support members 112, 114 disposed at a substantially perpendicular orientation to the upper surface 120 of the cart body 102. Also similar to the handle members 104, 106, the first and second end support members 112, 114 may be placed in other various other angular positions (e.g., 45°, 135°, 180°, 225°, or 270°) relative to the upper surface 120 (or a plane defined by the upper surface 120) of the body 102.

With reference now to FIGS. 7-21, various arrangements to which the assembly 100 is operably configured are depicted. FIGS. 1-6 depict an arrangement of the assembly 100 in a form to emulate a platform hand cart with rails substantially surrounding the periphery of the upper surface 120 of the body 102. FIG. 7a depicts an arrangement where one of the handle members 106 is in the storing position and another handle member 104 is in the operating position. This arrangement still emulates a platform hand cart, but only provides one handle member 104 for the user to grasp. Advantageously, one or more of the handle members 104, 106 are operably configured to telescope, e.g., extend and retract. In one embodiment, taking handle member 104 for example, the handle members 104, 106 may include a plurality of handle arms 700, 702 laterally (e.g., of or relating to the side or situated on, directed toward, or coming from the side) extending from, and rotatable with respect to, the cart body 102. Each of the plurality of handle arms 700, 702 may also include at least two portions 704, 706 telescopically coupled to another. The handle members 104, 106 may also include at least two cross members 708, 710 each separating a width between the plurality of handle arms 700, 702.

With reference to FIGS. 7a and 7b, in one embodiment, the handle members 104, 106 may telescope employing the use of one or more switches located on a gripping portion 712 of the handle members 104, 106. The switch(es) may be connected to one or more cables or rods 714 that may be biased in a lateral direction toward the sides 122, 200 of the body 102 with, for example, a spring 716. The end of these rods 714 may have one or more notches 718 sized to fit within a plurality of apertures 720a-b as shown in FIG. 7b, which depicts a sectional view of the handle member 106 about a cross section A-A. The gripping portion 712 may also have one or more switches operable to release the handle members 104, 106 from a locked position along the handle translation path 500. The at least two cross members 708, 710 of the handle members 104, 106 can also be seen separating a width 722 between the plurality of handle arms 700, 702. While FIG. 7b depicts the rod 714 and notch 718 extending from portion 706, in other embodiments, a rod or cable 714 and notch 718 may extend from the portion 704 and the apertures will be formed in portion 706.

Still referring to FIG. 7a, the cross members 724, 726 include a substantially planar outer surface 728, 730 that are coplanar and parallel with one another. Said in an alternative way, the surfaces 728, 730 define planes that are coplanar and parallel with one another. "Substantially planar" is defined as a generally flat surface without a severe curvature, e.g., +/−1.0 inch deviation in elevation with respect to the sides 1002, 1004 of an end support member. In other embodiments the end support members 112, 114 may define curvatures of on their surfaces that are either concave or convex in nature and outside of that range. In other embodiments, the surfaces 728, 730 may not be located on the cross members 724, 726, but rather may be placed on a portion of the handle arms 700, 702. Advantageously this permits, when the handle member 106 is in the storing position, the user to have a level surface to effectively place and transport objects on. This is particularly important when transporting items extending the substantially entire upper surface 120 of the cart body 102 or items that require a level carrying surface, e.g., a water-filled fish tank. In one embodiment, the entire outer surface of each of the cross members 724, 726 are planar. In other embodiments, only or more portions may be planar. In further embodiments, the cross members 708, 710, 724, 726 of each handle member 104, 106 have the above-described configuration. In further embodiments, when the handle member 104 is in the storing position, the surfaces 728, 730 are equidistant to the ends 124, 300 of the body 102 so as to provide a uniform and level placement surface. In preferred embodiments, this will result one of the cross members 724 on the first portion 506 of the body 102 and another cross member 726 on the second portion 508. Preferably, the upper surface 120 of the body 102 includes recesses formed for the handles 104, 106 to extend and fit into said recesses to effectuate an effective and efficient placement of either handle 104, 106 in the correct position to provide the above-describe configurations.

With reference to FIG. 8, a side elevational view of the assembly 100 can be seen. Specifically, the handle member 104 is still shown in an operating position and the handle member 106 is shown in a storing position. Advantageously, the two surfaces 728, 730 of their respective cross member 726, 724 can be seen lying in the same plane 732 that is parallel with one another. In additional embodiments, the substantially planar outer surfaces 728, 730 of each of the cross members 724, 726 are placed in a raised configuration above the upper surface 120 of the cart body 102 when either, or both, of the first and second handle members 104, 106 are placed in the storing position. FIG. 8 depicts this raised configuration with respect to handle member 106.

With reference to FIG. 9, the assembly 100 can be seen having the handle member 104 in a storing position, while the handle member 106 is in an operating position. In this arrangement, similar to FIG. 8, the handle member 104 can be seen having outer surfaces of each of the cross members being coplanar and parallel with one another. FIG. 9 also depicts an arrangement where the end support member 114 is configured in an operating position. As discussed previously, the end support members 112, 114 may be both, or singularly, translatable, e.g., rotatable, from a storing and operating position. End support member 114 can be seen defining a substantially planar support surface 900. The end support member may also have a substantially planar outer support surface 902.

With reference now to FIG. 10, the assembly 100 can be seen emulating another arrangement (i.e., a platform hand cart with no side rails). Specifically, the assembly 100 can be seen with one handle member 104 in an operating position and the other handle member 106, the rails support members 108, 110, and the end support members 112, 114 in a storing position. FIG. 10 also depicts the handle member 106 not telescoped and fixed only on one portion 506 of the body 102 to effectuate the placement of the body 102 in a folded position.

FIG. 10 also depicts an end member width (indicated with arrows 1000) separating a right side 1002 and an opposing left side 1004 of the end support member 114 defining the substantially planar support surface 900 (shown in FIG. 9). Beneficially, in one embodiment, the end member width 1000 is of a length no greater than the width (also indicated with arrows 1006) between the plurality of handle arms 1008, 1010. In one embodiment, the aspect ratio of the width 1000 to the width 1006 is approximately 1:1.2. In other embodiments, the aspect ratio may vary, i.e., be less than, greater, or equal to one another. The configuration of one or both of the end support members 112, 114 having a width 1000 less than the width 1006 between the handle members 1008, 1010 permits the end support members 112, 114 to be translated between the handle members 104, 106 regardless of their respective position. Said another way, this permits the end support members 112, 114 to be moved into an operating position regardless the position of the handle members 104, 106, such that the assembly 100 may be quickly configured from the platform hand cart arrangement shown in FIG. 10, to the hand truck arrangement shown in FIG. 11.

With reference to FIGS. 11-14, another arrangement of the assembly 100 can be seen. More specifically, the assembly 100 can be seen configured so as to emulate a hand truck. As such, one handle, e.g., handle 106, is rotated away from the upper surface 120 of the body 102 and the other handle 104 is placed in the storing position. The end support member, e.g., member 112, opposite the handle 104 is then placed in an operating position. Again, the end support member 112 may define a substantially planar surface 1100 that is used to support any objected desired to be transported with the assembly 100. In one embodiment, one or more rails 108, 110 may be placed in an operating position. In other embodiments, as shown specifically, in FIGS. 12-14, the rails 108, 110 may be placed in a storing position, either partially or fully recessed into the upper surface 120 of the body 102.

While FIG. 11 depicts the handle member 106 in an operating position and the handle member 104 in a storing position, an opposite configuration may be chosen. Additionally, the assembly 100 may include one or more alternative handle members, e.g., alternative handle member 1302, coupled to the body 102 and rotatable with respect to the bottom surface 1300 of the body 102. The bottom surface 1300 can be seen having a recess 1304 shaped and sized to allow the alternative handle member 1302 to be fully or partially recessed within the body 102. This beneficially permits the body 102 to be effectively folded into a folded position, as described herein. When the alternative handle member 1302 is used, the handle members 104, 106 may or may not be utilized in conjunction therewith. The alternative handle member 1302 is operably configured to be beneficially placed in a substantially perpendicular relationship with the bottom surface 1300 to permit the user to maneuver the assembly 100 effectively around corners and in tight spaces.

FIG. 12 depicts the assembly 100 in an erect position with the end support member 112 in an operating position. Advantageously, the rails 108, 110 can be seen placed in a storing position such that the assembly 100 is in an arrangement that emulates a hand truck with no side supporting rails. The assembly 100 can also be seen with one of the wheels 116b, 118b rotated from an operational position (shown in FIG. 11) to a storing position (FIGS. 12-14) along a wheel translation path (indicated with arrow 1304). The wheels 116a, 118a may also have a similar rotation path. The rotation of the wheels 116b, 118b permits the assembly 100 to be more effectively used as a hand truck. Similarly, the wheels 116a, 118a may also be rotated to a position that is closer to the end 124 of the body 102.

With reference now to FIG. 15, the assembly 100 can be seen configured in an arrangement that emulates a "dolly." Said another way, the handle members 104, 106, rails 108, 110, and end support members 112, 114 are placed in a storing position. Advantageously, the outer surfaces 728, 730, 1504, 1506 can also be seen coplanar and parallel with respect to one another to provide a level surface to transport and support objects thereon. In other embodiments, the surfaces 728, 730, 1504, 1506 may not be level. Furthermore, the body 102 may have additional surfaces 1508, 1510 disposed in an orientation that further supports a level transportation and support surface for an object. These surfaces 1508, 1510 are preferably disposed at a location on the body 102 proximal to the ends 124, 300.

FIG. 31 is a downward-looking perspective view of the dolly shown in FIG. 15 and also depicts handle portions, e.g., 3100, recessed within the ends 124, 300 of the body 102 to permit the user to easily transport, handle, or otherwise maneuver the device 100 whether the body 102 is in the extended position or folded position. In other embodiments, the handle portions 3100 may be partially recessed and/or not recessed and protruding in a direction away from the ends 124, 300.

With reference to FIGS. 13 and 15, the assembly 100 also includes a first wheel arm 1306 rotatably coupling one, e.g., 116a, of the first plurality of wheels 116a, 116b, to the right side 122 of the cart body 102 and a second wheel arm 1308 rotatably coupling a second, e.g., 116b, of the first plurality of wheels 116a, 116b to the right side 122 of the cart body 102. Additionally, assembly 100 includes a third wheel arm 1310 rotatably coupling one, e.g., 118a, of the second plurality of wheels 118a, 118b, to the left side 200 of the cart body 102 and a fourth wheel arm 1312 rotatably coupling a second, e.g., 118b, of the second plurality of wheels 118a, 118b to the left side 200 of the cart body 102. In one embodiment, the first, second, third, and fourth wheel arms 1306, 1308, 1310, 1312 can be seen positioning the respective first and second plurality of wheels 116a-b, 118a-b laterally to the cart body 102. Advantageously, in one embodiment, each of the wheels 116a-b, 118a-b and their respective arms 1306, 1308, 1310, 1312 are operably configured to rotate independent of one another to achieve the various configurations and arrangements discussed herein. In an additional embodiment of the invention, additional wheels may be placed or coupled to the wheels 116a-b and/or wheels 118a-b to provide a wider or more surface area to contact the ground surface upon which the assembly 100 travels. This is particularly beneficial when transporting the assembly 100 in mediums such as sand. The additional wheels may be coupled to open apertures in the arms 1306, 1308, 1310, 1312 or they may be coupled to portions such as the handle portion 3100 (shown in FIG. 31) or to a portion 1314 on the bottom surface 1300 of the body 102.

With reference to FIG. 16 of the present invention, the assembly 100 is shown in an isometric view of the dolly arrangement with the components 104, 106, 108, 110, 112, 114 of the assembly 100 in a storing position.

With brief reference back to FIGS. 1 and 4, the upper surface 120 of the cart body 102 beneficially includes a plurality of recesses 136a-n shaped to contour a periphery edge of the left and right support rails 108, 110 and the first and second end support members 112, 114, wherein the letter "n" represents any number of recesses corresponding on the amount of components desired to be recessed within the upper surface 120. More specifically, to effectively achieve the various arrangements of the assembly described herein, the end members 112, 114, support rails 108, 110, and/or handle members 104, 106 may be rotated from their respective operating positions toward the upper surface 120 of the body 102 and into their respective storing positions.

The storing positions may include the recesses 136a-n sized and shape to permit the left and right support rails 108, 110 and/or the end support members 112, 114 to be partially or fully recessed into the cart body 102. Said another way, the left and right support rails 108, 110 and/or the end support members 112, 114 may be partially or fully recessed into the cart body 102 in their storing positions such that an outer surface of the components 108, 110, 112, 114 may be coplanar and parallel with the upper surface 120 of the cart body 102. When the components 108, 110, 112, 114 are recessed within the body 102, this may result in a substantially planar upper surface 120 of the body 102. In additional embodiments, the handle members 104, 106 may also be partially or fully recessed into the upper surface 120 of the body 102. This may include the handle members 104, 106 disposed in the lateral side edges of the body 102 when in the storing position.

For example, recess 136a is shaped and sized to permit the side guard 132 to fully recess into the upper surface as shown in FIG. 4. In one embodiment, the back surface 400 of the guard 132 forms a planar upper surface 120 when placed in the storing position. In other embodiments, the back surface 400 may not create a planar or flat upper surface 120. The recess 136b can be seen as forming a portion on the body 102 where the end member 114 is placed when in the storing position. To create a planar upper surface 120 of the body 102, two recesses, e.g., 136b and another recess (not shown), are sized to permit the end member 114 to be stored and the guard member 132 folds on top of the end member 114. As such, the recess 136a will have a depth (e.g., length from the upper extent of the upper surface 120 to a lower surface of the recess 136a) sized to permit the thickness of a portion of the end member 114 and the thickness of a portion of the guard member 132 to be received and form a planar upper surface 120.

FIG. 4 also depicts an exemplary hitch 402 used in connection with the present invention. The hitch 402 advantageously provides a user the ability to tow or transport multiple assemblies together or attach the assembly to a vehicle, e.g., bicycle or golf cart. In one embodiment, the hitch 402 may be fixedly-coupled to the body 102, e.g., molded into the frame of the body 102. In other embodiments, the hitch 402 may be removably couplable to the body 102 through the recessed portion 3100 at the ends 124, 300 of the body 102 as shown in FIG. 31.

As discussed above, FIG. 16 depicts two portions 506, 508 of the body 102 being rotated along the body translation path 1600 such that the bottom surfaces 1300 are adjacent and/or noncoplanar and parallel to one another. This configuration, also referred to as a "compact dolly," is shown in FIG. 17. Advantageously, the handle members 104, 106, end support members 112, 114, and rail support members 108, 110 can also be seen at least partially recessed into the body 102 while in the folded position. FIG. 17 also depicts the wheels 116a, 118a rotated to a position to provide a level contact surface for the wheels 116a-b, 118a-b. In other embodiment, both sets of the plurality of wheels 116a-b, 118a-b may be rotated to achieve a level surface for the assembly 100 to maneuver.

Figure 18:
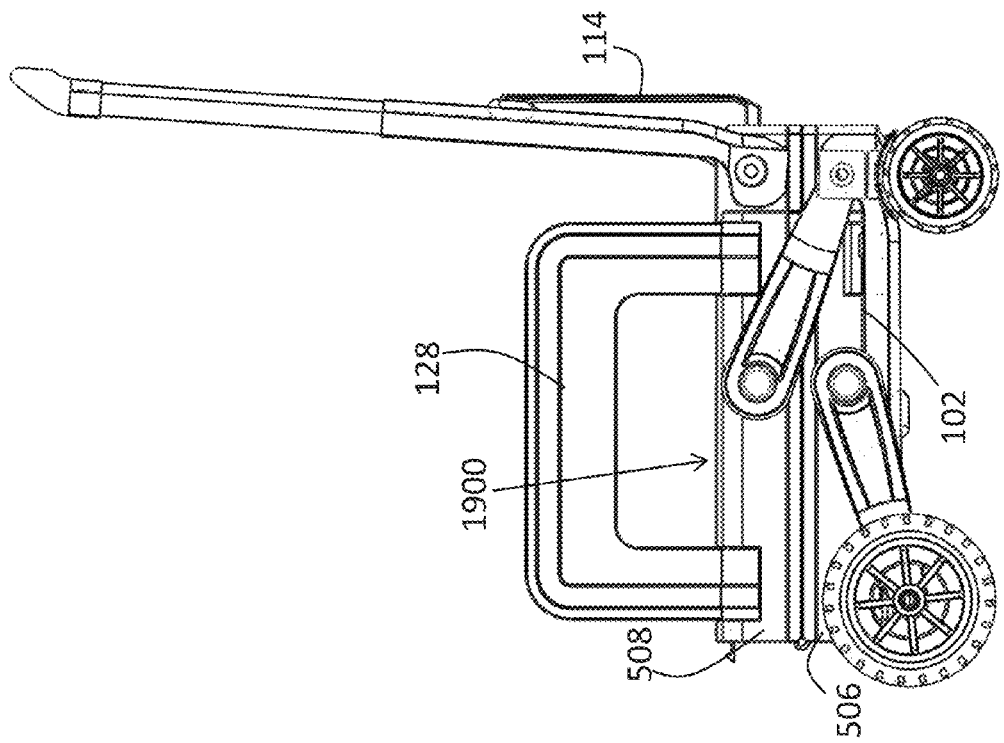
FIGS. 18-19 are elevational side views of the assembly of FIG. 1 in a folded position to emulate a hand cart with and without side guards in accordance with an embodiment of the present invention.
Figure 19:
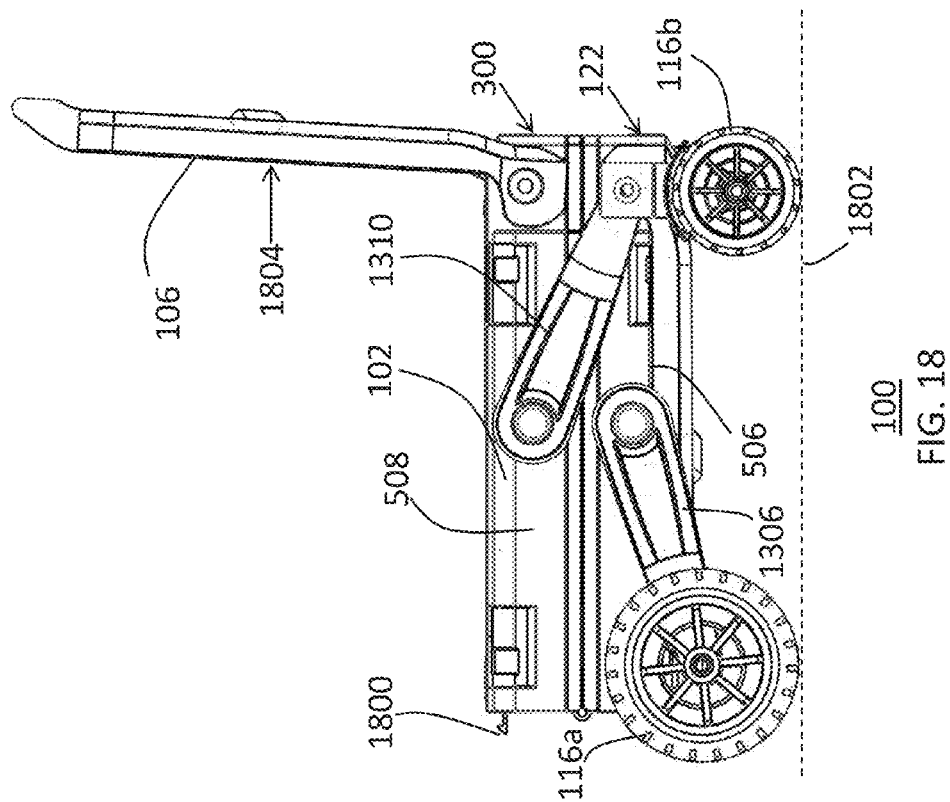

More specifically, with reference to FIGS. 18 and 19, the portion 506 of the body 102 is operably configured to selectively detach from the portion 508 and rotate toward the back surface of portion 508 to a folded position, as shown. The portions 506, 508 may selectively detach from one another using one or more fastening members, e.g., fastener 1800, that may be electronically or mechanically moved into various position to permit the portions 506, 508 to couple and uncouple with one another. As shown in FIGS. 18 and 19, the fastener 1800 may be a notched push tab positioned to insert within a channel formed on the other portion 506.

FIG. 18 depicts a side elevational view of the assembly 100 in an arrangement that emulates a hand cart without any side support members. To achieve said arrangement the wheels 116a, 118a and/or their respective arms 1306, 1310 are rotated approximately 165°+/−15° degrees away from the end 122 of the cart body 102. This rotation permits a surface of the wheels 116a-b, 118a-b to define a substantially level plane (indicated as plane 1802). Said another way, the assembly 100 is operable configured to provide rotation of the wheels 116a-b, 118a-b to provide a substantially level contact surface for the wheels 116a-b, 118a-b to transport on. FIG. 18 also depicts the handle member 106 in an operating position to facilitate the user in maneuvering the hand cart 100.

The arrangement of the assembly 100 shown in FIG. 19 emulates a hand cart with side supports to advantageously keep objects within the assembly 100 during transport. Specifically, FIG. 19 depicts the side support members 128, 132 and the end support member 114 in an operating position. In other embodiments, the assembly 100 may include a face attachment piece that has portions operably configured to clip, e.g., using tongue-and-groove configuration, or otherwise attach, e.g., using a hook-and-loop configuration, onto a portion of the side support members 128, 132 so as to substantially enclose the space surrounding the periphery of the upper surface 1900 of the portion 508 of the body 102. In that vein, although the side support members 128, 132 are shown shaped in a generally "U-shape," in other embodiments of the invention, any of the side support members, e.g., members 128, 132, may include substantially enclosed surfaces to prevent any objects from exiting the assembly 100 through any aperture formed in the side support members.

With reference now to FIGS. 20 and 21, FIG. 20 depicts an elevational side view of the compact dolly and FIG. 21 depicts an elevational side view of the assembly 100 in a folded and "storing" position. While the assembly 100 may be stored in the arrangement shown in FIG. 20, the arrangement of the assembly 100 shown in FIG. 21 advantageously permits the assembly 100 to be even more ergonomically compact and fit within tight spaces to maximize the versatility of the assembly 100. To achieve the storing position, along with many of the other arrangements discussed herein, the wheels 116a-b, 118a-b are operably configured to rotated through depression of a switch 2000 that is rotatably coupling the arms 1306, 1308, 1310, 1312 to the body 102. FIG. 21 also depicts one embodiment of the present invention when one or more of the arms, e.g., arm 1310, includes two portions 2002, 2004 rotatably coupled together to permit one of the plurality of wheels 116b, 118b coupled to portion 2002 to be rotated with respect to arm portion 2004.

Figure 23:
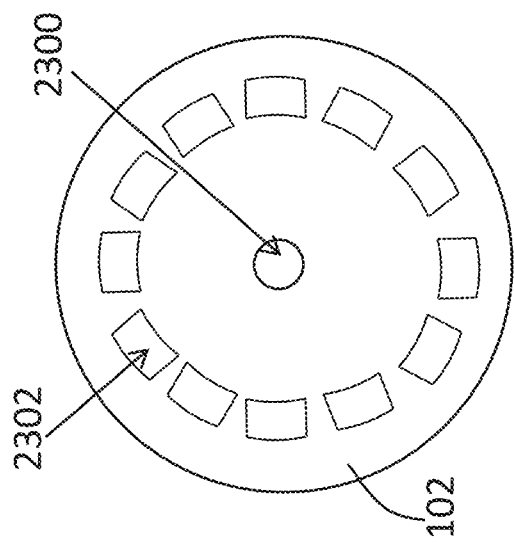
FIG. 23 is a fragmentary close-up view of a portion of the cart body used in conjunction with the switch of FIG. 22.
Figure 22:
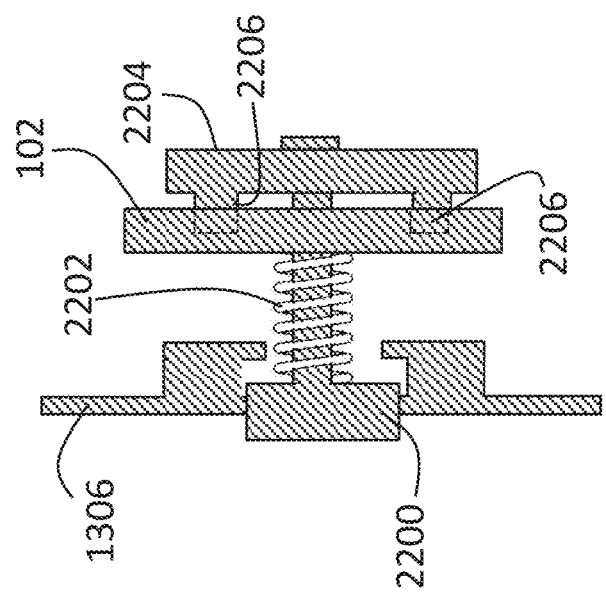
FIG. 22 is a cross-sectional close-up view of the section B-B in FIG. 21 depicting an exemplary switch used to operably rotate a wheel and wheel arm.

To achieve the rotation of the wheel arms 1306, 1308, 1310, 1312 with respect to the body 102, the portions 2002, 2004 with respect to one another, or another other component discussed herein with an rotating movement, an exemplary switch 2000 is shown in FIG. 22. More specifically, FIG. 22 depicts a cross-sectional view along section A-A of an exemplary embodiment of a switch 2200 coupling the arm 1306 and wheel 116a to the body 102 of the assembly 100. The switch includes a button 2200 biased by a spring 2202. The button 2200 includes a notched securing member 2204 fastened thereto. With reference to FIG. 23, the body 102 is formed to have apertures 2300 sized to receive the notched portions 2206 of the notched securing member 2204. The body 102 may be formed with a plurality of recesses 2302 sized to receive the notched securing member 2204. Therefore, when the user desires to move the arms/wheels, he or she depresses the button 2200, moves the arm 1306 to the desired angular position, releases the button, and locks the notch portions 2206 into the desired angular position dictated by the spacing of the apertures 2302. In other embodiments, the wheel arms 1306, 1308, 1310, 1312 and portions 2002, 2004 may be rotatably coupled together using a bolt and nut configuration that requires user manipulation to place the components in a locked configuration and a translating configuration. The above-described switch(es) and other inner components of the body can also be seen in FIG. 32, which depicts a fragmentary top view of the assembly 100.

Figure 25:

As discussed above, FIGS. 24-25 depict another embodiment of the present invention that utilizes a side guard member(s) 2400, 2402 that are coupled together when placed into the operating position.

Figure 29:
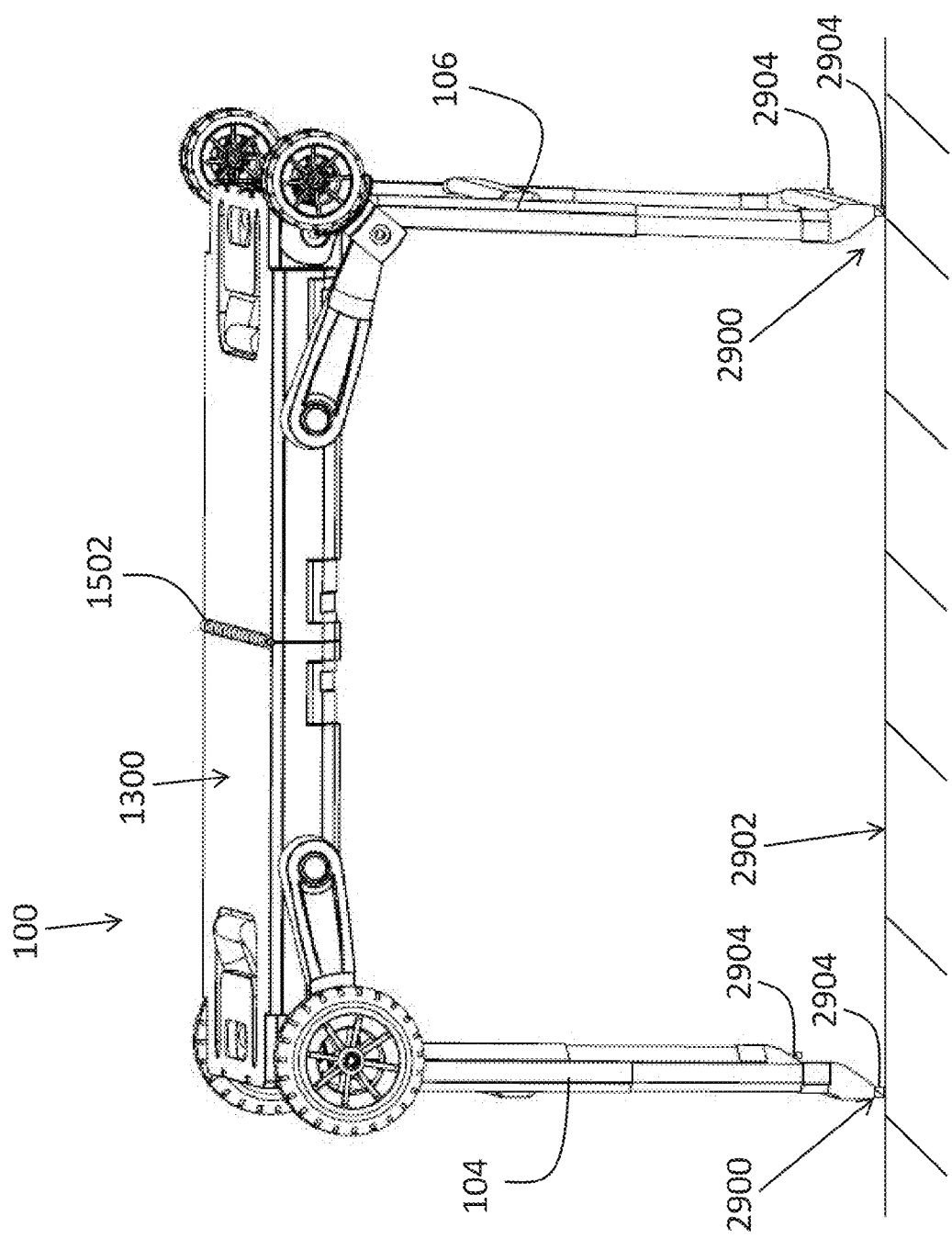
FIG. 29 is a downward-looking perspective view of the assembly of FIG. 1 in an arrangement emulating a table in accordance with an embodiment of the present invention.
Figure 30:
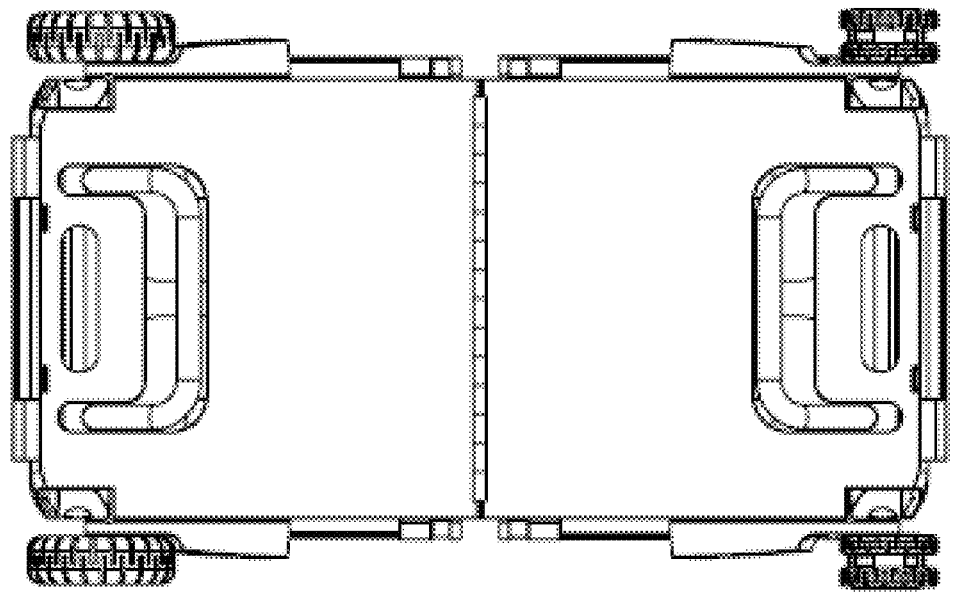
FIG. 30 is a top plan view of the assembly in the arrangement shown in FIG. 29.

With reference to FIG. 29, an embodiment of the assembly 100 is shown in another arrangement emulating a table. In said arrangement, the assembly 100 looks similar to that of FIG. 6, but it is inverted such that the distal end 2900 of the handle members 104, 106 are placed on a ground surface 2902. To effectuate this arrangement, the body 102 of the assembly 100 can be seen placed in the extended position and the bottom surface 1300 is substantially planar, e.g., excluding any ridges similar to those of the hinge 1502, to provide a level surface for the user. Moreover, the wheels 116a-b, 118a-b are placed in storage position such they do not exceed the plane defined by the bottom surface 1300. Moreover, in one embodiment, the handle members 104, 106 are extendable/retractable to increase, decrease, or otherwise vary the height of the assembly 100. The height should preferably be approximately 3-5 feet, but it may vary outside of these ranges. Additionally, to provide a stable support surface the handle members 104, 106 include one or more rubber stoppers 2904 or other friction-inducing materials/components coupled to the distal end 2900 of the handle members 104, 106. The stoppers 2904 may be placed on opposing sides of the distal ends 2900 of the handle members 104, 106 or may be continuously placed on the outer periphery of the distal ends 2900 of the handle members 104, 106.

Figure 26:
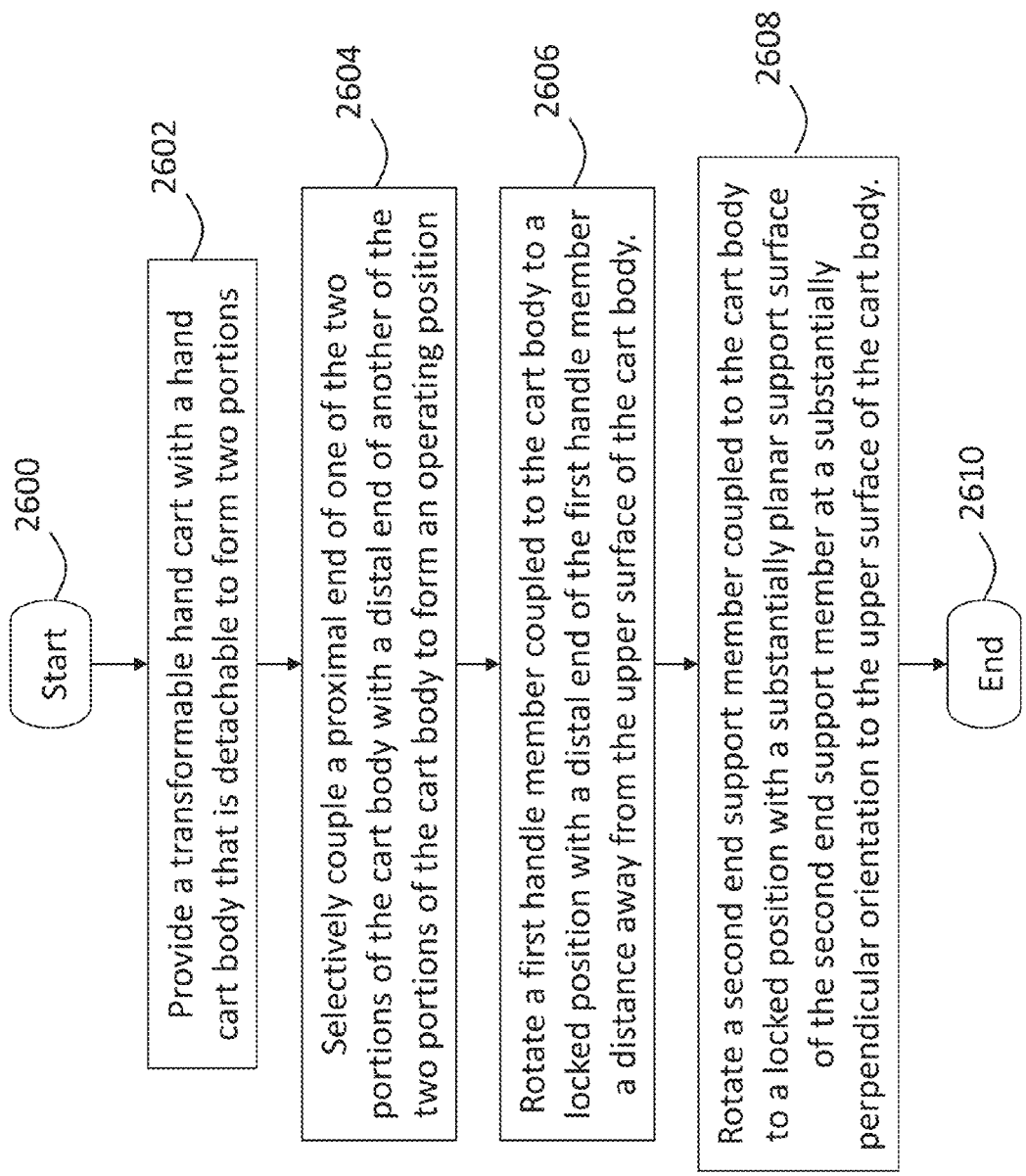
FIG. 26 is a process flow diagram depicting an exemplary method of transforming a hand cart in accordance with one embodiment of the present invention.
Figure 27:
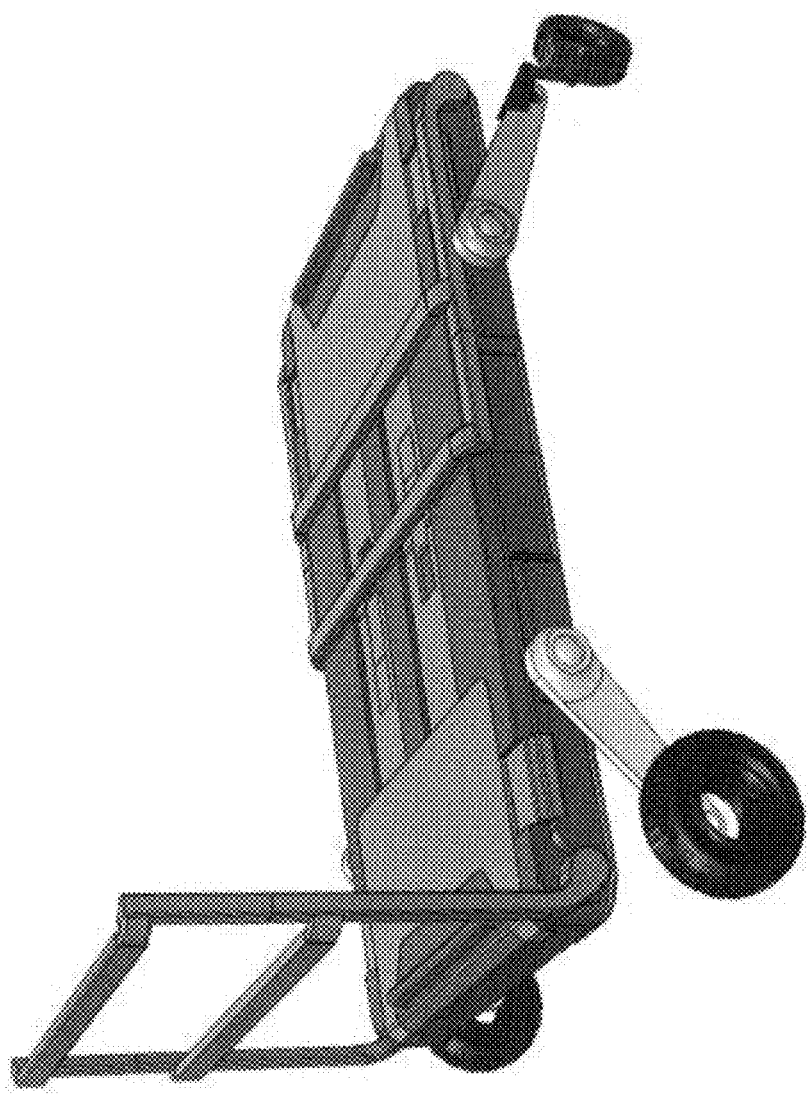
FIGS. 27-28 are downward-looking perspective views of the transformable hand cart assembly shown in FIGS. 24-25.
Figure 28:
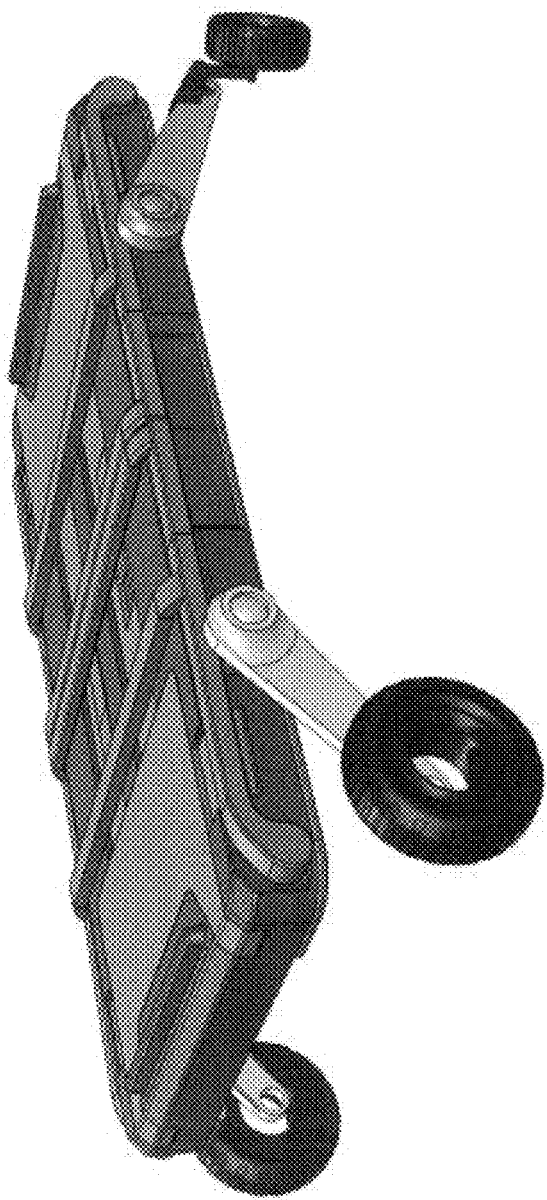

With reference to FIG. 26, a process flow diagram is depicted illustrating an exemplary method of transforming a hand cart assembly from a folded arrangement (e.g., from a dolly) to an extended arrangement (e.g., a hand truck). As inherent in the above disclosure, the assembly 100 includes various arrangements that effectively and efficiently emulate a variety of different types of hand carts and/or dollies. One such exemplary method of transformation starts at step 2600 and immediately proceeds to step 2602 of providing a cart body with all of the above-described features and characteristics. The cart assembly 100 may also advantageously utilize other features such as an LED light, a power generation unit (i.e., a battery—with and without solar panels—having outlet ports for charging electrical devices), audio/visual ports, speakers and displays communicatively coupled to the audio/visual ports that are operable to transmit audio and images to a user, computing and networking devices operable to process and transmit data to outside computing devices, and GPS capability to autonomously navigate the assembly 100 to desired locations or provide directions to a user, all of which may be coupled to or imbedded within the body 102 or other components of the assembly 100 to provide for a more ergonomic device.

For example, the cart body may have an upper surface, a bottom surface, a left side, a right side opposite the left side, a first end, a second end opposite the first end, and be operably configured to selectively detach to form two portions of the cart body. Each of the two portions of the cart body may include a proximal end and a distal end. The assembly also includes a left support rail rotatably coupled to the left side of the cart body and a right support rail rotatably coupled to the right side of the cart body. Furthermore, the assembly may include a plurality of wheels coupled to the right side of the cart body and a second plurality of wheels coupled to the left side of the cart body. Additionally, the assembly may include a first handle member rotatably coupled to the first end of the cart body, a second handle member rotatably coupled to the second end of the cart body, a first end support member rotatably coupled to the cart body, and a second end support member rotatably coupled to the cart body. The cart body of the assembly is operable to move into a folded position with the two portions of the cart body at least partially detached from one another and both the upper surface and bottom surface of each of the two portions of the cart body in an overlapping configuration. The folded position also includes the first and second handle members, the left and right support rails, and the first and second end support members are at least partially recessed into the upper surface of at least one of the two portions of the cart body.

Preferably, all components of the assembly 100 are made with durable yet light-weight material such as ABS plastic with a hardness of approximately 40-60 that may be manufactured using a variety methods, e.g., injection molding. In other embodiments, certain components, e.g., wheels 116a-b, 118a-b, may be made with a metallic material, composite material, or plastic material having a shore D hardness of approximately 60-90 or hardness outside of these ranges.

Process continues to step 2604 of selectively coupling a proximal end of one of the two portions of the cart body with a distal end of another of the two portions of the cart body to form an operating position. Thereafter, the process continues to step 2606 of rotating the first handle member to a locked position with a distal end of the first handle member a distance away from the upper surface of the cart body. Next, the process continues to step 2808 of rotating the second end support member to a locked position with a substantially planar support surface of the second end support member at a substantially perpendicular orientation to the upper surface of the cart body. The process terminates at step 2610.

A transformative hand cart assembly has been disclosed that provides the ability for a user to ergonomically manipulate the assembly so as to reduce its size from a device that is easily storable and transportable to various embodiments of a hand cart applicable for various applications of use. These various embodiments may include a "dolly," both compact and extended, to a small hand cart used to carry and transport items such as files, to a platform cart for carrying larger items, to a hand truck used to move furniture. The transformative hand cart assembly may also be utilized in conjunction with storage inserts to form a shopping cart and may be oriented to form a table.

What is claimed is:

1. A transformative hand cart comprising:
a cart body having an upper surface, a bottom surface, a left side, a right side opposite the left side of the cart body, a first end, and a second end opposite the first end of the cart body;
a first handle member rotatably coupled to the first end of the cart body;
a second handle member rotatably coupled to the second end of the cart body, the first and second handle members having a storing position and an operating position along a handle translation path, the storing position including the first and second handle members at least partially recessed into the body, the operating position including a distal end of the first and second handle members disposed a distance away from the cart body;
a left support rail rotatably coupled to the left side of the cart body;
a right support rail rotatably coupled to the right side of the cart body, the left and right support rails having a storing position and an operating position along a rail translation path, the storing position including the left and right support rails at least partially recessed into the upper surface of the body, the operating position including the left and right support rails disposed at a substantially perpendicular orientation to the upper surface of the cart body;
a first end support member rotatably coupled to the first end of the cart body;
a second end support member rotatably coupled to the second end of the cart body, at least one of the first and second end support members defining a substantially planar support surface, the first and second end support members having a storing position and an operating position along an end support translation path, the storing position including the first and second end support members at least partially recessed into the upper surface of the body, the operating position including the first and second end support members disposed at a substantially perpendicular orientation to the upper surface of the cart body; and
a plurality of wheels coupled to the body,
the first and second handle members each having a plurality of handle arms laterally extending from, and rotatable with respect to, the cart body, the plurality of handle arms each having two portions telescopically coupled to another and each having at least two cross members each separating a width between the plurality of handle arms, each of the at least two cross members including a substantially planar outer surface, the substantially planar outer surface of each of the at least two cross members are coplanar and parallel with one another and placed in a raised configuration above the upper surface of the cart body when the at least one of the first and second handle members are placed in the storing position.

2. The transformative hand cart according to claim 1, wherein the cart body further comprises:
two selectively foldable portions, the two selectively foldable portions having an extended position along a cart body translation path and a folded position along the cart body translation path, the extended position includes the upper surface of the two portions of the cart body coplanar and parallel with each other, the folded position includes the upper surface of the two portions of the cart body noncoplanar and parallel with each other.

3. The transformative hand cart according to claim 2, wherein:
the two selectively foldable portions are operably configured to rotate about an axis spanning through a center of the cart body.

4. The transformative hand cart according to claim 2, further comprising:
a plurality of left support rails, including the left support rail, one of the plurality of left support rails independently rotatably coupled to the left side of one of the two selectively foldable portions of the cart body and a second of the plurality of left support rails independently rotatably coupled to the left side of a second of the two selectively foldable portions of the cart body; and
a plurality of right support rails, including the right support rail, one of the plurality of right support rails independently rotatably coupled to the right side of one of the two selectively foldable portions of the cart body and a second of the plurality of right support rails independently rotatably coupled to the right side of a second of the two selectively foldable portions of the cart body.

5. The transformative hand cart according to claim 1, wherein:
the first and second handle members, the left and right support rails, and the first and second end support members are rotatably coupled to the cart body and operably configured to rotate in a direction toward and away from the upper surface of the body.

6. The transformative hand cart according to claim 1, wherein:
the storing position of the left and right support rails includes the left and right support rails fully recessed into the cart body and the storing position of the first and second end support members includes the first and second end support members fully recessed into the cart body, at least one of an outer surface of the left and right support rails and an outer surface of the first and second end support members coplanar with the upper surface of the cart body.

7. The transformative hand cart according to claim 1, wherein:
the first and second handle members are operably configured to telescope.

8. The transformative hand cart according to claim 1, wherein the at least one of the first and second end support members defining the substantially planar support surface further comprises:
an end member width separating a right side and an opposing left side of the at least one of the first and second end support members defining the substantially planar support surface, the end member width of a length no greater than the width between the plurality of handle arms.

9. The transformative hand cart according to claim 1, wherein the upper surface of the cart body further comprises:
a plurality of recesses shaped to contour a periphery edge of the left and right support rails and the first and second end support members.

10. The transformative hand cart according to claim 1, further comprising:
a first wheel arm rotatably coupling one of a first plurality of wheels to the right side of the cart body:
a second wheel arm rotatably coupling a second of the first plurality of wheels to the right side of the cart body;
a third wheel arm rotatably coupling one of a second plurality of wheels to the left side of the cart body; and
a fourth wheel arm rotatably coupling a second of the second plurality of wheels to the left side of the cart body, the first, second, third, and fourth wheel arms positioning the respective first and second plurality of wheels laterally to the cart body.

11. The transformative hand cart according to claim 10, wherein:
at least one of the of the first plurality of wheels and the second plurality of wheels are respectively configured to rotate independent of one another.

12. A transformative hand cart comprising:
a left support rail and a right support rail coupled to a cart body;
a plurality of wheels coupled to a right side of the cart body and a second plurality of wheels coupled to a left side of the cart body;
a first handle member coupled to the cart body and a second handle member coupled to the cart body; and
a first end support member coupled to the cart body and a second end support member coupled to the cart body, the cart body having:
two portions operably configured to selectively detachably recouple and divide the cart body about an axis spanning through a center of the cart body;
a folded position along a cart body translation path with an upper surface of each of the two portions of the cart body noncoplanar and parallel with each other and with a bottom surface of each of the two portions of the cart body noncoplanar and parallel with each other; and
an extended position along the cart body translation path with the upper surface of each of the two portions of the cart body coplanar and parallel with each other and with the bottom surface of each of the two portions of the cart body coplanar and parallel with each other,
wherein the first and second handle members, the left and right support rails, and the first and second end support members are at least partially recessed into the upper surface of at least one of the two portions of the cart body in the folded position.

13. The transformative hand cart according to claim 12, wherein the cart body further comprises:
a hinge operably configured to couple the two portions of the body as the two portions of the body are selectively detached from one another.

14. A transformative hand cart comprising:
a cart body having an upper surface, a bottom surface, a left side, a right side opposite the left side of the cart body, a first end, and a second end opposite the first end of the cart body;
a first handle member rotatably coupled to the first end of the cart body;
a second handle member rotatably coupled to the second end of the cart body, the first and second handle members having a storing position and an operating position along a handle translation path, the storing position including the first and second handle members at least partially recessed into the body, the operating position including a distal end of the first and second handle members disposed a distance away from the cart body;
a left support rail rotatably coupled to the left side of the cart body;
a right support rail rotatably coupled to the right side of the cart body, the left and right support rails having a storing position and an operating position along a rail translation path, the storing position including the left and right support rails at least partially recessed into the upper surface of the body, the operating position including the left and right support rails disposed at a substantially perpendicular orientation to the upper surface of the cart body;
a first end support member rotatably coupled to the first end of the cart body;
a second end support member rotatably coupled to the second end of the cart body, at least one of the first and second end support members defining a substantially planar support surface, the first and second end support members having a storing position and an operating position along an end support translation path, the storing position including the first and second end support members at least partially recessed into the upper surface of the body, the operating position including the first and second end support members disposed at a substantially perpendicular orientation to the upper surface of the cart body; and
a plurality of wheels coupled to the body,
the first and second handle members having a plurality of handle arms laterally extending from, and rotatable with respect to, the cart body, the plurality of handle arms each having two portions telescopically coupled to another and each having at least two cross members each separating a width between the plurality of handle arms,
wherein at least one of the first and second end support members define the substantially planar support surface and includes an end member width separating a right side and an opposing left side of the at least one of the first and second end support members defining the substantially planar support surface, the end member width of a length no greater than the width between the plurality of handle arms.

\* \* \* \* \*